United States Patent
Shofner et al.

(10) Patent No.: US 9,286,577 B2
(45) Date of Patent: Mar. 15, 2016

(54) SUSTAINABLY RECYCLABLE ARTICLES OF MANUFACTURE AND RELATED METHODS

(76) Inventors: Christopher Kyle Shofner, Clemmons, NC (US); Jeffrey Donald Irwin, Elkin, NC (US)

(*) Notice: Subject to any disclaimer, the term of this patent is extended or adjusted under 35 U.S.C. 154(b) by 1089 days.

(21) Appl. No.: 13/018,346

(22) Filed: Jan. 31, 2011

(65) Prior Publication Data

US 2011/0200807 A1    Aug. 18, 2011

Related U.S. Application Data

(60) Provisional application No. 61/337,000, filed on Jan. 29, 2010, provisional application No. 61/337,167, filed on Jan. 29, 2010, provisional application No. 61/337,466, filed on Feb. 4, 2010.

(51) Int. Cl.
- *B32B 7/02* (2006.01)
- *G06Q 10/00* (2012.01)
- *G06Q 30/02* (2012.01)

(52) U.S. Cl.
CPC ............ *G06Q 10/00* (2013.01); *G06Q 30/0202* (2013.01); *Y10T 428/24942* (2015.01); *Y10T 428/24992* (2015.01)

(58) Field of Classification Search
USPC ................................................. 428/212, 218
See application file for complete search history.

(56) References Cited

U.S. PATENT DOCUMENTS

| 5,298,321 A * | 3/1994 | Isoda et al. ..................... 442/359 |
| 2003/0096882 A1 * | 5/2003 | Fujita ............................. 521/48 |

FOREIGN PATENT DOCUMENTS

JP        2000004993 A  *   1/2000

OTHER PUBLICATIONS

Machine_English_Translation_of_JP_2000004993_A; Tada, Minoru; Automotive Seat; Jan. 11, 2000; JPO; whole document.*
Curran, Mary Ann; Life Cycle Asessment; May 2006; Scientific Applications International Corporation; whole document.*
True, Inc., "TerraTEXT 101: Our Journey Toward Sustainability," brochure, copyrighted 2008, 11 pages.
Anderson, Ray C., "Mid-Course Correction: Toward a Sustainable Enterprise: the Interface Model," (c)1998, 207 p., Chelsea Green Publishing Co., White River Junction,VT, USA.

* cited by examiner

*Primary Examiner* — Tahseen N Khan
(74) *Attorney, Agent, or Firm* — J. Bennett Mullinax, LLC

(57) ABSTRACT

Articles of manufacture that are sustainably recyclable and related methods are provided. The article can include a first element having a first polymeric material and a first physical parameter and a second element having a second polymeric material and a second physical parameter. The first polymeric material of the first element and the second polymeric material of the second element are substantially chemically similar while the first physical parameter of the first element and the second physical parameter of the second element are physically different. Methods for manufacturing sustainably recyclable articles are also provided.

23 Claims, 13 Drawing Sheets

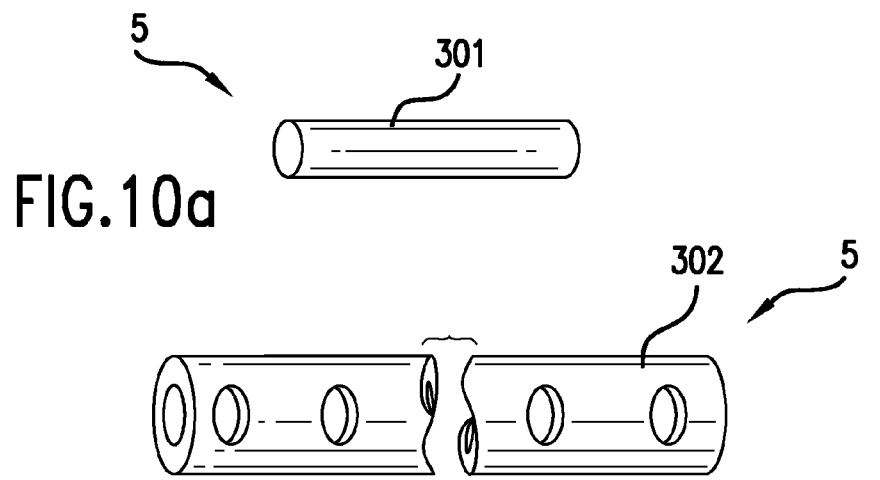
FIG.10a
FIG.10b
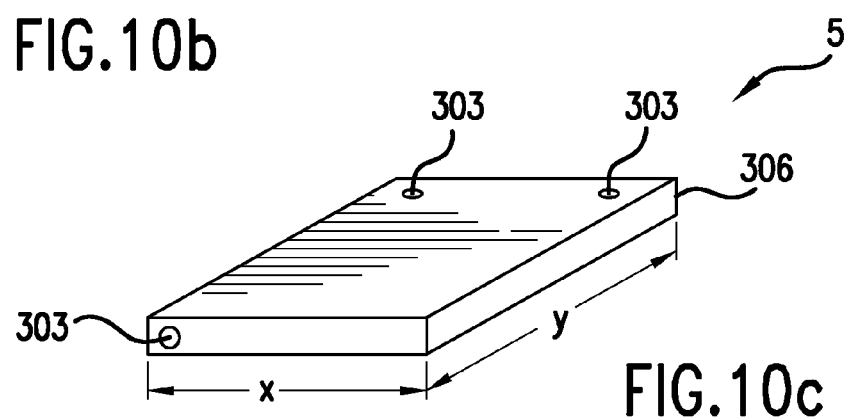
FIG.10c
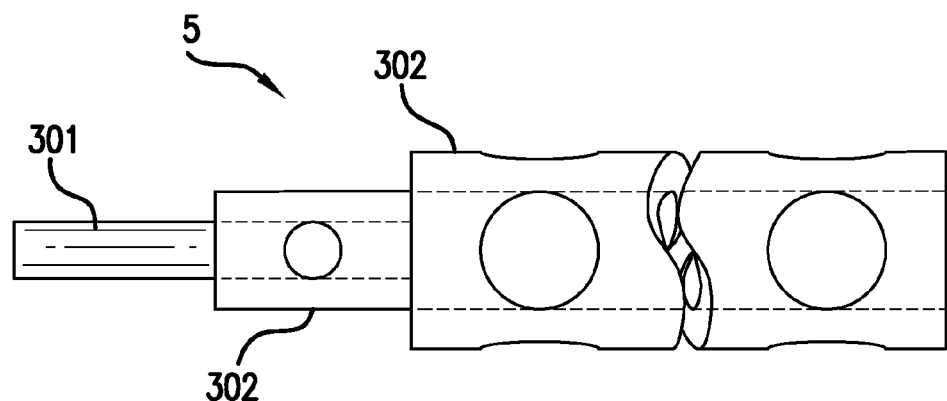
FIG.11

SUSTAINABLY RECYCLABLE ARTICLES OF MANUFACTURE AND RELATED METHODS

RELATED APPLICATIONS

The presently disclosed subject matter claims the benefit of U.S. Provisional Patent Application Ser. No. 61/337,000, filed on Jan. 29, 2010; U.S. Provisional Patent Application Ser. No. 61/337,167, filed on Jan. 29, 2010; and U.S. Provisional Patent Application Ser. No. 61/337,466, filed Feb. 4, 2010; the disclosures of which are each incorporated herein by reference in their entireties.

TECHNICAL FIELD

The presently disclosed subject matter relates generally to articles of manufacture that can be at least partially recycled and related methods. More particularly, the present subject matter relates to articles of manufacture that can be sustainably recyclable and related methods for determining and designing the same.

BACKGROUND

In order to sustain qualities of life currently associated with free markets, long term, it is critically and urgently important to enable changes in practices relating to commerce in articles of manufacture. Unfortunately, the problems of wasting precious resources and environmental impacts associated with current practices are so complex that it is overwhelmingly difficult to know where to begin. Consequentially, in spite significant efforts by a few leaders, relatively few changes have been made. Perhaps the clearest guidelines to rational changes are those set forth in the well-known mantra of 3Rs: Reduce, Reuse and Recycle. Recycling, although potentially beneficial, has proven to be elusive and difficult to justify because reclamation costs are excessive and/or the reclaimed materials of construction exhibit poor performance. The true costs and impacts over the total life cycle of manufactured articles, from market definitions of need, product design, manufacturing, distribution and selling, use and finally, recycling or disposal, must be carefully considered. Among such considerations are increasingly useful and quantitative methods known as Life Cycle Assessments (hereinafter "LCAs"), which concepts and procedures are applied and extended hereinbelow.

The preceding paragraph is a synopsis of voluminous efforts and writings, including patents, of technology, business and political leaders, and also citizens who are concerned with sustainable commerce, with conservation of precious resources, and minimizing environmental impacts upon our planet. Exemplary for this disclosure are R. C. Anderson's excellent book, *Midcourse Correction* and, his leadership example as Founder and long-term CEO of Interface Carpets, Inc. headquartered in LaGrange, Ga. (hereinafter, "Interface Carpets"). The positive results at Interface Carpets clearly define the problems of "business as usual" and show, by exemplary actions, what can be done with intense focus and commitment of a conscientiously-managed enterprise. These actions, much more effectively than words, set the stage for inventive needs and opportunities in the "Next Industrial Revolution," an interesting and relevant descriptive phrase promoted by Mr. Anderson. The booklet, *Terra-Text*101: *Our Journey to Sustainability*, was published by True Textiles, Inc., headquartered in Grand Rapids, Mich. (hereinafter "True Textiles") a "green" spin-off from Interface Carpets, and is also an excellent overview in this area. The book and booklet are incorporated herein in their entirety.

SUMMARY

It is an object of the presently disclosed subject matter to provide articles of manufacture that can be sustainably recyclable and related methods for determining and designing such sustainably recyclable articles.

An object of the presently disclosed subject matter having been stated hereinabove, and which is achieved in whole or in part by the presently disclosed subject matter, other objects will become evident as the description proceeds when taken in connection with the accompanying drawings as best described hereinbelow.

BRIEF DESCRIPTION OF THE DRAWINGS

A full and enabling disclosure of the present subject matter including the best mode thereof to one of ordinary skill in the art is set forth more particularly in the remainder of the specification, including reference to the accompanying figures, in which:

FIGS. 10a-10c illustrate schematic perspective views of embodiments of sustainably recyclable furniture elements according to the present subject matter;

FIG. 11 illustrates a schematic perspective view of another embodiment of a sustainably recyclable furniture element according to the present subject matter;

DETAILED DESCRIPTION

Figure 1:
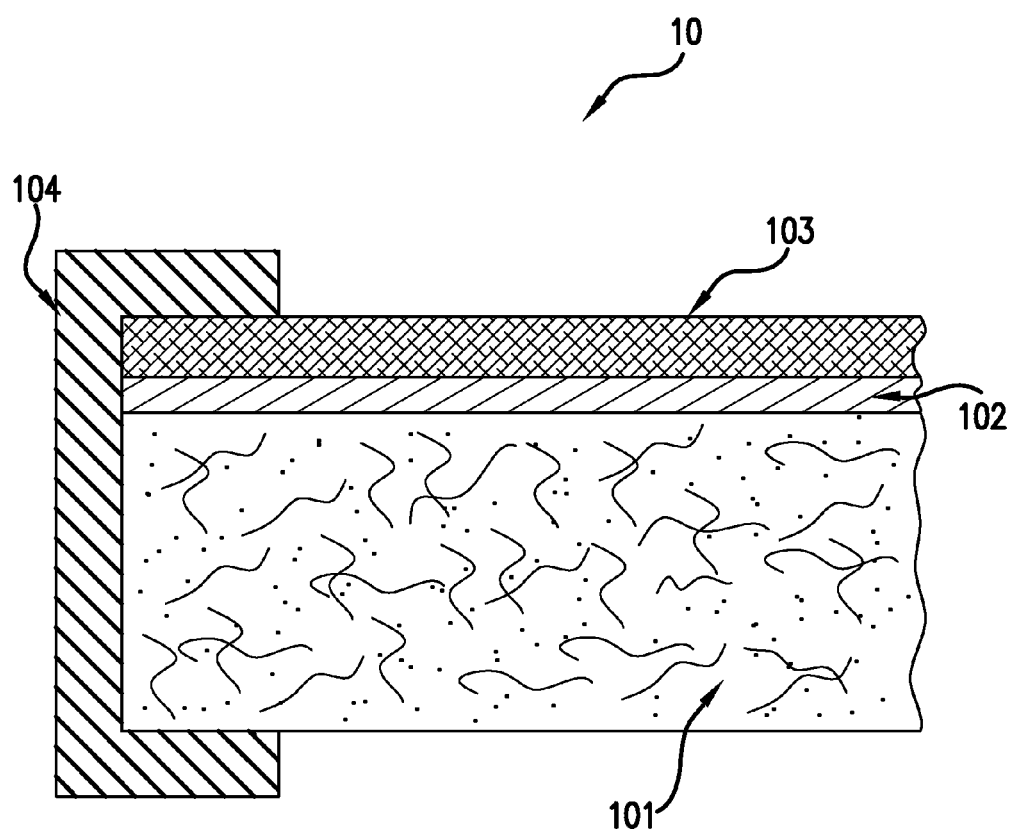
FIG. 1 illustrates a schematic cross-sectional view of a portion of an embodiment of a sustainably recyclable printable composite panel according to the present subject matter.

Reference will now be made in detail to the description of the present subject matter, one or more examples of which are shown in the figures. Each example is provided to explain the subject matter and not as a limitation. In fact, features illustrated or described as part of one embodiment may be used in another embodiment to yield still a further embodiment. It is intended that the present subject matter cover such modifications and variations.

"Market assessment" as used herein means market-based research information that is organized and analyzed to assess performance and cost attributes expected by customers: "Will the article do what I want? Are the costs (original, usage, disposal) justifiable, vis-a-vis the performance?" The information can include, but is not limited to, market trends, competition, product strategies, and distribution channels. Hopefully, a market trend is that customers will increasingly expect more sustainable articles or products.

"Life cycle assessment" as used herein means technical and cost research information that is organized and analyzed to assess true, total costs over the entire life cycle of the article and, more particularly, to assess the environmental impacts of the article, its materials of construction, and the processes or services throughout the production, usage, and disposal life cycle phases.

"Performance attributes" as used herein means any features or specifications associated with an article to meet the needs (better, requirements or expectations) of the customer.

"Cost attributes" as used herein means any costs associated with an article, including, but not limited to, purchase, use and disposal costs, which costs are directly paid by or on behalf of the customer and therefore considered by said customer for purchase, use and disposal. These costs do not include environmental impact or societal costs.

"Sustainability attributes" as used herein means environmental and societal impact costs or "footprint" based on an LCA of an article, from production, usage, and through disposal. LCAs shall be in accordance with, for example, ISO14 040 or comparable standards or appropriate comparisons thereof, such as ratios like Sustainably Recyclable ratio SR, defined below.

"Candidate design" as used herein means article under consideration for manufacturing that first meets performance and cost attribute requirements, as expected by customers, and which is subjected to evaluations of its potential sustainability attributes, such as Sustainably Recyclable ratio. This definition easily extrapolates to an article already being manufactured but subject to redesign, or to a competitive article.

"Reference design" as used herein means an article of manufacture whose LCA has been established and publically known and which is generally similar to a candidate design.

"Sustainably recyclable" as used herein is a ratio of an average footprint of a candidate design divided by an average footprint of a reference design, both footprints based on consistent LCAs.

Sustainably recyclable articles and methods for manufacturing sustainably recyclable articles are provided herein. For example, an article of manufacture that is sustainably recyclable can be provided that can comprise a first element comprising a first polymeric material and a first physical parameter and a second element comprising a second polymeric material and a second physical parameter. The first polymeric material of the first element and the second polymeric material of the second element can be substantially chemically similar and the first physical parameter of the first element and the second physical parameter of the second element can be physically different. The first polymeric material of the first element and the second polymeric material of the second element, for example, can chemically similar in a manner that permits both the first element and the second element to be recycled together. In some embodiments, the first polymeric material of the first element and the second polymeric material of the second element can be chemically similar in a manner that permits the article of manufacture to be recycled as a whole. In some embodiments, the first polymeric material of the first element and the second polymeric material of the second element are chemically the same.

In some embodiments, the first polymeric material of the first element and the second polymeric material of the second element comprise at least one of virgin polyethylene terephthalate ("PET") or recycled polyethylene terephthalate ("rPET"). In some embodiments, the first physical parameter of the first element can have a different density than the second physical parameter of the second element. In some embodiments, the first physical parameter of the first element can have a different construction than the second physical parameter of the second element. In some embodiments, the first physical parameter of the first element can comprise fibers and the second physical parameter of the second element can comprise a solid non-fibrous structure.

In embodiment methods, market needs are determined for a recyclable article, including performance and cost attributes, and a candidate design can be identified, including materials of construction and manufacturing and recycling processes. A market assessment can be executed for the candidate design directed to commercial viability of the article having the performance attributes (represented by "P") and cost attributes (represented by "C"). A Performance minimum (represented by "Pmin") and a cost maximum (represented by "Cmax") can be identified for the commercial viability of the articles. The market assessment can be performed as follows:

(i) if P<P min or C>Cmax, candidate article is not commercially viable; iterate (for example, redesign) or abandon design; or (ii) if P>P min and C<Cmax, candidate article is commercially viable;

Thus, if the performance of the candidate design does not meet a minimum performance standard or the cost of manufacturing the candidate design is greater than a maximum cost standard, then the candidate design of the article can be redesigned or the design can be abandoned. If the performance does meet a minimum performance standard and the cost of manufacturing the candidate design is less than a maximum cost standard, then the candidate design of the article can be commercially viable.

A life cycle assessment ("LCA") for the candidate design can be executed and a sustainably recyclable ratio (represented by "SR") can be determined for the candidate design. A maximum value for the sustainably recyclable ratio, or maximum sustainably recyclable ratio standard (represented by "SRmax") can be determined. The sustainably recyclable ratio can be used to determine the life cycle assessment as follows:
  (i) if SR>SRmax, candidate design is not sustainably recyclable; iterate (for example, redesign) or abandon design; or
  (ii) if SR<SRmax, candidate design is sustainably recyclable;

Thus, if the sustainably recyclable ratio of the candidate design exceeds a maximum sustainably recyclable ratio standard, then the candidate design of the article can be redesigned or the design can be abandoned. If the sustainably recyclable ratio of the candidate design is less than a maximum sustainably recyclable ratio standard, then the candidate design of the article can be sustainably recyclable.

LCAs are known, particularly including International Standards Organization ISO 14 040 and various on-line versions such as Dantes and Sustainable Minds. Ford of Europe, following ISO guidelines, developed a Product Sustainability Index, PSI, specifically for the automotive industry. Ford's PSI is intended as a design tool for the earliest stages of engineering and for demonstrating to the public the reduced environmental impacts of its cars. True Textiles, in its publication *TerraText*101: *Our Journey to Sustainability* shows results from a comprehensive LCA for virgin and recycled polyester woven fabric, and show as much as 48% reduction in environmental footprint. Both the Ford PSI and True Terratext publications utilize so-called "spider charts" which graphically demonstrate reductions in environmental "footprints."

In some embodiments, alternative candidate designs to the first candidate design can be identified and a market assessment and lifecycle assessment for each alternative candidate design can be performed. Based on the analysis of the viability and sustainable recyclability, at least one of the candidate designs can be selected for manufacture.

Once the candidate design is determined to be both commercially viable and sustainably recyclable, article of manufactures can be produced. An article of manufacture can be tested to confirm that the candidate design does meet the standards set forth for it for commercial viability and sustainable recyclability.

An article can be distributed, used and reused in a commercial environment. Upon reaching the end of its first use life, the article of manufacture can be dispose of in various ways including:
  (i) recycling part or all the article's parts or basic materials of construction; or
  (ii) extracting energy from part or all the article's materials of construction; or
  (iii) transporting part or all of the article's materials of construction to a land fill.

Example embodiments of articles of manufacture and related methods according to the present subject matter are provided herein. The embodiments and methods can enable the manufacture of reusable and sustainably recyclable articles of manufacture with materials of construction comprised of virgin or recyclable polymers or mixes thereof. The different embodiments provided below reveal the breadth of applicability of the present subject matter. Recycled and virgin polyethylene terephthalate, (hereinafter referred to as "PET"), materials of construction are disclosed by way of example only and are not to be construed as a limitation to the present subject matter. Other polymers, for example, such as olefins, like polypropylenes and polyethylenes, aramids, like meta-aramids and para-aramids, nylons, fiberglass, basalt, polylactic acid and the like can be used as well.

a. Composite Panel for Printing or Sound Absorption/Decoration

Figure 2:
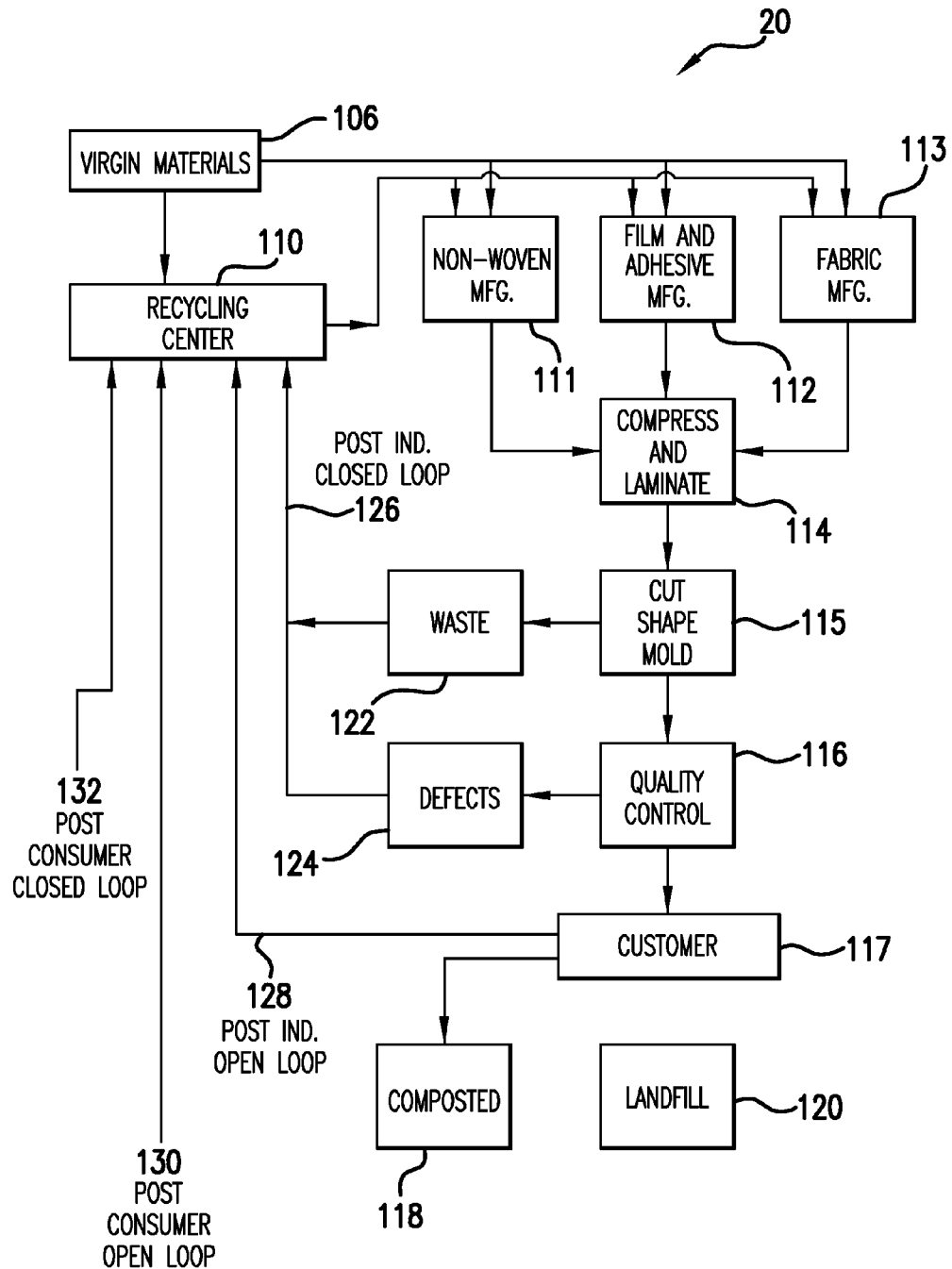
FIG. 2 illustrates a flowchart of an embodiment of sustainable manufacturing and reclamation process flow according to the present subject matter.
Figure 3:
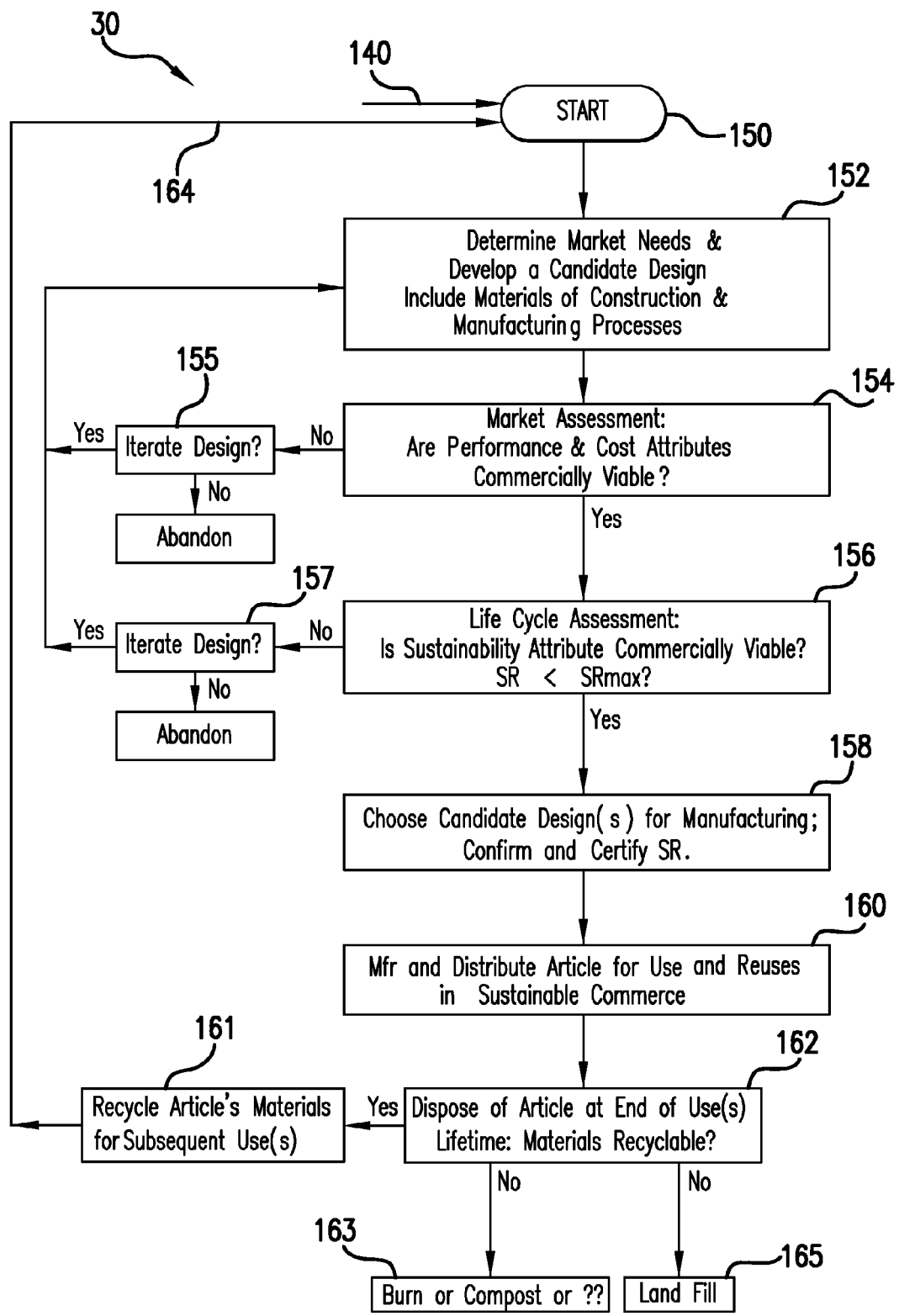
FIG. 3 illustrates a flowchart of an embodiment of manufacturing and a sustainability recyclable article of manufacture according to the present subject matter.

In accordance with the present subject matter, a composite polymeric panel assembly 10 is provided in FIG. 1. Additionally, a manufacturing and reclamation process flow 20 is shown in FIG. 2 for making an article of manufacture, such as composite polymeric panel assembly 10. An LCA-based decision-making method is illustrated in FIG. 3 for confirming if a candidate design for an article of manufacture, such as composite polymeric panel assembly 10 is sustainably recyclable. Further, practical, real-world results are described for blends of PET that is an example polymer that is widely-used. It will be appreciated that the present subject matter may be applied to candidate articles under consideration for commerce, in iterative marketing and product design steps, or to articles already in commerce in need of improvements. The methods of the present subject matter may further be extended to in-house development choices, to comparisons with competitive products, or even extended to individual purchase decisions for which sustainability is considered.

As introduced above, a partial end cross section of composite panel assembly 10 is illustrated in FIG. 1. Composite panel assembly 10 can comprise four principal elements: body section 101, film barrier 102, fabric cover 103 and frame 104. Body section 101 can be a semi-rigid structure preferably manufactured from a composite of polymeric materials that are virgin, recycled or a mixture thereof, as described below. Film barrier 102 can be used for print applications. Fabric cover 103 can also be used for print applications, for example, acoustic and decorative office panels. All elements of composite panel assembly 10 can comprise chemically similar but physically different polymeric materials. The materials used in the four principal elements of panel assembly 10 can be chemically similar so that panel assembly 10 can be recycled as a whole, with minimal or no costs for separation in the recycling reclamation process. The materials used in the four principal elements of panel assembly 10 can be physically different so that the elements can provide the indicated functionalities of structural body 101, film barrier 102, fabric cover 103 and frame 104. Detailed disclosures for the four elements follow.

Panel assemblies 10 having these four elements can be suitable for print boards or for acoustical/decorative panel applications wherein high quality digital color printing is made on one or both sides of panel assemblies 10. Composite panel assemblies 10, when printed upon, can be referred to commercially as "Print Board." When they are constructed as a composite of recycled or virgin or a mix of PET, as described next, composite panel assemblies 10 can be referred to commercially as "Polyboard". composite panel assemblies 10 manufactured according to the present subject matter can omit one or more elements, or add others, for other applications than printing, such as to filtration or to furniture, in accordance with embodiments disclosed in Sections 9b and 9c. As discussed above, other polymeric materials are viable recyclable materials: PETG, HDPE, LDPE, Acrylic, Nylon 6, Nylon 66, and etc. These embodiments do not use toxic adhesives or toxic FR chemistry.

Semi-rigid structural panel 101 of composite panel assembly 10 can be a non-woven polymeric composite structure which can be made up of synthetic or agro-based polymer fibers with different melting points. as used herein, the term "synthetic" means, for example, oil-based polymers, such as PET, as opposed to natural polymers such as polylactic acid, PLA. Other polymers can of course be used. For example, semi-rigid structural panel 101 can comprise PET. In general, the material composition of Semi-rigid structural panel 101 can be about 50-80% high melt and about 20-50% low melt polymer. Virgin PET is available, for example from such companies as Unifi Manufacturing, Inc. ("Unifi"), headquartered in Greensboro, N.C., E.I. DuPont de Nemours and Company headquartered in Wilmington, Del., and Celanese International Corporation in Dallas, Tex. Recycled PET is available, for example from Unifi, Palmetto Textiles, Inc. headquartered in Spartanburg, S.C., Leigh Fibers, Inc. headquartered in Spartanburg, S.C., Fiber Innovation Technology, Inc. headquartered in Johnson City, Tenn. and others. The high melt fibers can be 0-100% post industrial or post consumer material provided from open or closed loop reclamation processes. The nonwoven can be formed using a cross-lapped or needle punched process method. For some applications, an air-laid process can be used as the manufacturing process. The non-woven can next be compressed to create a semi-rigid nonwoven using a Reliant Laminator with cooling zone.

In some embodiments, typical dimensions of semi-rigid structural body section 101 can be about 3/16"×about 48"×about 96" (exclusive of frame 104). The weight of the nonwoven having aforesaid dimensions can be, for example, approximately 10 lbs. In some embodiments, the weight could be more or less. In some embodiments, the thickness range can be between about 1/32" and about 8". The weight per sq. ft range can be from about 0.1 lbs to about 2 lbs. Dimensions for semi-rigid structural body sections 101 with about 8" thicknesses can be about 130" width or less and about 130" length or less. These semi-rigid structural body sections 101 can be cut into customized shapes for uses other than panel assemblies 10. Applications for a semi-rigid structural body section 101 can include, for example, gymnasium wall pads with about a 2" thickness and a density of about 1 lb/sq.ft., acoustical panels with about a 1" thickness and a density of about 0.5 lb/sq.ft., and gutter filters with about a 4" thickness and a density of about 0.75 lb/sq.ft.

Film barrier 102 of composite panel assembly 10 can be important to panel assembly 10 for printing applications, when the printing is directly upon film barrier 102 or on upon cover fabric 103 laminated thereto. Film barrier 102 can be an opaque barrier to hide color and small structural imperfections in, for example, a nonwoven semi-rigid structural body section 101, where imperfections are more visible when recycled raw materials are used for body section 101. Film 102 can also provides a barrier to air flow for efficient printing and cutting, enabling the composite panel assembly 10 to be held down onto perforated platen surfaces by suction forces. In some embodiments, air flow permeabilities of about 3 CFM/sq.ft. of surface area can provide adequate suction forces.

One or both sides of film barrier 102 may be coated with an adhesive to bond cover fabric 103 to semi-rigid structural body section 101. The adhesive should also be chemically similar to the main 4 elements 101,102,103, 104 so that it does not restrict recycling the panel assembly 101 as a whole. Film barrier 102 can also provide a fire retardant (FR) barrier, as required for some commercial uses, such as sound absorbing office panels upon which decorative images can be printed. Printing can be made upon the cover fabric 103 or, when fabric cover 103 is omitted, directly upon film barrier 102. Any inks that will adhere to either film barrier 102 or fabric cover 103 can be used to print on film barrier 102 or fabric cover 103. In some embodiments, soy or other vegetable oil-based inks can be used. Vendors for digital color printers can include Grandi Innovations, a division of AGFA Corporation with U.S.

Film barrier 102 can be made from virgin materials, such as or recycled materials. The thin film barrier may be between about 0.0005" and about 0.10" thick. A thinner film barrier 102 can be used to create a vacuum barrier. A thicker film barrier 102 can be used to improve board stiffness, hide non-woven imperfections (color & dimples), and can provide a superior flat surface to print on. When film barrier 102 thickness is < about 0.01", it can be referred to as a thin film barrier.

Typically, for bonding or laminating film barrier 102 to structural body section 101 or to fabric cover 103, simultaneously or separately, temperatures can be between about 190° F. and about 400° F. at a processing speed of 5-35 feet per minute using a Double Belt Compression Laminator with a cooling zone. A thin film barrier 102 can be solution dyed. It can be applied directly to fabric cover 103 or structural body section 101 using a hot melt extrusion process to minimize handling, shipping, and scrap costs. Film barrier 102 can also provide good acoustical sound reflection. Relocating film barrier 102 between fabric cover 103 and high-loft nonwoven of structural body section 101 can provide excellent acoustical sound absorption.

Cover fabric 103 of composite panel assembly 10 can be of woven, nonwoven, or knit construction. The fabric can provide an esthetically pleasing, textured, fine art appearance to the observer compared to the flat surfaces of [polystyrene] boards.

The extruded u-shaped frame 104 of composite panel assembly 10 can protect the board, can hide the composite edge, and can increase the stiffness of composite panel assembly 10. Frame 104 can be external to other elements of composite panel assembly 10 or integrated into them. Frame 104 can also be manufactured of similar materials to enable recycling as a whole without material separation. A u-shape frame is extruded by melting the polymer thru an extrusion screw and pushing it thru a u-shape machined collar. The u-shape frame is cooled in a water bath and removed to cut into various lengths. Other forms can be extruded from rectangular tubes to solid rods. Other functional parts can be extruded in the u-shaped frame to restrain the fabric or create a separate channel to feed communication components such as wiring. FIG. 2 describes a manufacturing and reclamation process flow diagram 20 for composite panel assembly 10, as described in FIG. 1 and hereinabove, and by extension, for other sustainably recyclable articles of manufacture. The initial material inputs for non-woven manufacturing step 111, film or adhesive manufacturing step 112, and fabric manufacturing step 113 can be virgin, recycled or a blend. Careful selection, during the design phase, of chemically similar polymeric materials that can be sustainably recyclable as a whole with minimal or no separation of elements during the reclamation phase of recycling. Intentionally careful selection, as used herein, means that comparable attention is given to Performance attributes, Costs attributes and Sustainability attributes (PCS) in evaluating candidate designs for articles of manufacture, such as polymeric composite panel assemblies 10 (see FIG. 1) and, the like.

Compression and lamination 114, which can be performed, for example, sequentially or simultaneously, can combine the chemically similar polymer materials, using a flatbed laminator in a one step processor in two sequential steps. It can be possible to laminate both sides of the nonwoven structural body section 101 with fabric cover 103 and film barrier 102 in a one step process.

After lamination 114, composite panel assembly 10, typically without frame 104, can next be cut, shaped, or molded in step 115, depending on the end use of the article. A post industrial closed-loop waste stream 122 and a quality defects stream 124, which can be sorted by a quality control department 116, can be combined, collected and packaged for efficient and beneficial handling and transportation to a recycling center 110 without material separation. Currently, dissimilar materials that required separation would go to a landfill 120, which is not beneficial. While it is feasible to separate dissimilar post industrial materials in a reclamation step, the cost and time incurred is almost always economically and environmentally negative. Thus, one aspect of the present subject matter, intentionally designing for sustainably recyclable articles of manufacture as a whole, can be more fully appreciated.

After quality control 116, the end product, in this embodiment the composite panel assembly 10, can be shipped to the customer 118. After its initial useful life (preferably including reuses, as applicable), the product can be placed in commercial or residential recycling bins to be sent to a recycling center 110. If the product is biodegradable, it can be composted 118 into fertilizer for residential or commercial uses. Known freight services, such as USPS, FedEx or UPS can be environmentally viable alternatives for transporting special products or closed-loop recycling applications back to the manufacturer for recycling. Distributors can also play a vital role in taking back the waste, defects, and end-of-life products. This offers a value-added service for their customers and a revenue stream for the scrap material. This recycling effort can provide an opportunity for back-hauling. Contrariwise, dissimilar materials that require separation can be sent to the landfill or recycled for a fee, provided that the owner transports the item to the recycling center. Transporting materials to landfills is a step to be avoided as much as possible.

Recycling center 110 can collect post industrial and post consumer materials to be recycled back into fiber or extruded into fiber film or hard parts. The recycling center 110 may need to add virgin material to improve the physical or chemical properties of recycled chip.

It will clarify a first aspect of the present subject matter to elaborate upon a feature of the embodiment disclosed as composite panel assembly 10. By using chemically similar but physically different forms of polymeric materials for the multiple elements of composite panel assembly 10, the article can be recycled as a whole, thus minimizing costs in the polymer reclamation step of the recycling process. Not only can separation costs be minimized or even totally eliminated, recyclability can be enhanced. One example of a recyclable article of manufacture having chemically similar but physically different elements can be composite panel assembly 10 for which the polymer can be recycled PET (hereinafter "rPET"). One form of rPET can be used for structural body section 101 and can be of nonwoven, nonwoven compressed or needle-punched construction, so that it is semi-rigid. Film barrier 102 can also be rPET. For example, rPET film barrier can be made using film extrusion processes. Such rPET film can be provided by Repete Plastics, Inc., headquartered in Geneva, Ill.

Fabric cover 103 can be, for example, TerraTex®, a woven construction made from rPET yarns. TerraTex® is provided by True Textiles, Inc. headquartered in Grand Rapids, Mich. and is described more fully below. A fourth form of physically different rPET can be used for frame 104. The U-shaped frame can be extruded using 100% rPET. Injection molding processes are also viable to create stiff three dimensional parts. If frame 104 is internal to or otherwise integrated with body section 102 (or any other elements), reclamation center 110 in FIG. 2 may grind 100% rPET and feed it directly into the extruder or injection molding device. Various other materials and processes, including various heat and pressure treatments, can be used to make the physically different elements 101, 102, 103, 104 of rPET in composite panel assembly 10 shown in FIG. 1, such that the elements can be sufficiently chemically similar that composite panel assembly 10 is recyclable as a whole in the recycling steps of manufacturing and reclamation flow diagram 20 shown in FIG. 2. Recycling composite panel assembly 10, which, in the example given above, is itself made of once-recycled PET, provides further benefits toward sustainability. But it is very important to note that the focus in this disclosure is upon the improved sustainability attributes resulting from using rPET rather than virgin PET for the composite panel 10. This will be made quantitatively clear upon disclosure of the concepts underlying Sustainably Recyclable ratio, SR, below.

The chemically similar but physically different forms of polymeric materials can be virgin, recycled or a mix of both. Furthermore, and also importantly, it is noted that the raw materials of an article of manufacture such as composite panel assembly 10 can be from multiple recyclings and then further recycled itself at the end of its useful life. For example, virgin PET can be used for water or other beverage bottles, then recycled and reprocessed into rPET, the raw material as just described for composite panel assembly 10, perhaps with a small % of virgin low melt PET to improve performance. After the useful life of composite panel assembly 10 is over, including multiple reuses as appropriate, the rPET in the elements of composite panel assembly 10 can be then reclaimed and reprocessed again into raw materials for an automotive headliner, for example.

In some embodiments, it may not be necessary that all elements of composite panel assembly 10 be chemically similar in order to retain significant portions of the benefits of the present subject matter. For example, frame 104 can be aluminum or other metal, which is typically stronger than rPET. In this example, frame 104 can be reused multiple times while the other elements could be removed as a whole sub-unit, reused in another frame or in another application, and ultimately recycled as a whole, thus retaining some of the commercial benefits of the present subject matter. Frame 104 can itself also be recyclable at the end of its first use life. Its reclamation and reprocessing can follow known processes for metals that are generally similar to those shown in FIG. 2 for polymeric materials.

Disclosed hereinabove are first aspects of the present subject matter, for materials and processes, particularly recycling an article of manufacture as a whole. Disclosed hereinbelow are second aspects of the present subject matter, namely, quantitative methods for assessing sustainability. These disclosures are sufficient for one skilled in the art to confirm the novelties of the present subject matter and to reproduce the articles of manufacture disclosed. By obvious extensions to those skilled in the art, other articles, materials and processes, or quantitative methods are anticipated by the present subject matter.

As for consumer buyers (actually, because of them), the fundamental and current dominant factors influencing commercial viability of a candidate product can be characterized by performance attributes P and cost attributes C. Since the beginnings of mass production in the early 1900s, product or article of manufacture design decisions have been almost totally exclusively based on performance attributes P and cost attributes C, with almost utter disregard for sustainability attributes S. Such disregard can cause wasteful consumption of precious resources or unacceptable environmental impacts, like global warming. However, all 3 sets of attributes—P, C and S—are consequential to the design choices made in the product development phases with the design choices being primarily those for materials of construction and for manufacturing processes utilized. That is, known engineering and accounting methods enable evaluations of and choices between multiple candidate designs according to performance attributes P and cost attributes C. Now, increasingly, and advantageously with use of the present subject matter, choices can also be based on sustainability attributes S.

Therefore, we describe below, in accordance with second aspects of the present subject matter, quantitative methods for including the attribute of commercial Sustainability S along with Performance P and Costs C attributes into the design process. This will relate intimately to the design flow chart 30 in FIG. 3. But first it is important to introduce the concept of Sustainably Recyclable Ratio, SR, and other information and factors that support quantitative determinations of SR.

Sustainability is a very complex subject that has heretofore been misunderstood and misused. A commendable contribution to improving this dismal situation has been made in the booklet, *TerraText 101: Our Journey Toward Sustainability*, a publication of True Textiles. This booklet is incorporated herein in its entirety and referred to as TerraText. Quantitative results from a comprehensive Life Cycle Assessment (LCA) are presented in TerraText comparing rPET with virgin PET. These results dramatically prove that polyester fabrics made from rPET exhibit an environmental and precious resource impact or "foot print" that is much smaller than the same fabrics made with virgin PET. This embodiment of an LCA has 12 factors to consider including: embodied energy, embodied mass, water used, global warming potential, acidification potential, ozone depletion potential, eutrophication potential, photochemical oxidant potential, fresh water ecotoxicity potential, human toxicity potential, terrestrial ecotoxicity potential, the resource index. The definitions and/or descriptions of these factors are included in TerraText and are included herein by reference. An overall estimate for the benefit is the average of the 12 factors considered in the LCA for PET, reproduced below from TerraText:

| | |
|---|---|
| Embodied Energy | 34% |
| Embodied Mass | 43% |
| Water Used | 73% |
| Global Warming Potential | 54% |
| Acidification Potential | 74% |
| Ozone Depletion Potential | 36% |
| Eutrophication Potential | 56% |
| Photochemical Oxidant Potential | 11% |
| Fresh Water Ecotoxicity Potential | 80% |
| Human Toxicity Potential | 61% |
| Terrestrial Ecotoxicity Potential | 82% |
| The Resource Index | 19% |
| Overall Average "Foot Print" | 52% |

The numbers following the 12 factors are the fractional percentages of impact for rPET, when compared by ratio to virgin PET. Thus, for example, the embodied energy in rPET is 34% of that found in virgin PET, the depletion of precious resources ratio is 19%, and so forth. From this rather comprehensive LCA for rPET and PET, the overall average "foot print," meaning the average of these 12 factors with equal weighting for each factor, can be used as a measure of sustainability: the lower, the better. Increasing or decreasing the number of impact factors in the LCA, or calculating the factors differently for different materials or processes, or weighting them differently, yields different overall averages but the concept is clear. Overall averages or foot prints calculated as just disclosed from Life Cycle Assessments can define just how sustainably recyclable an article of manufacture can be. Such comparisons evidently compare one material of construction, rPET in this example, to another, PET. That is, for the composite panel 10 example, with emphasis using rPET instead of PET can provide articles of manufacture that are comparable in attributes of Performance P and Cost C and, importantly, superior in the attribute Sustainability S, as quantitatively and clearly demonstrated by the overall average or "foot print." The foot print of a candidate design (or candidate footprint) is thus the average of the factors of the LCA used to calculate the LCA of the candidate design. The foot print of a reference design (or reference footprint) is the average of the factors of the LCA used to calculate the LCA of the reference design.

Similar LCAs can, of course, be performed for articles designed and made from other polymers or, indeed, for any material of construction and manufacturing process. It can be appreciated that there are numerous approaches to LCA, several of which have been reduced to generic software. The basic concepts of LCAs can be improved and adapted to fit particular purposes. But no matter how obviously more sustainable rPET can be than virgin PET, for example, commerce in recyclable or, better, sustainably recyclable materials and articles of manufacture made from them still lags. This is because of the inherent predisposition of buyers to base purchase decisions almost entirely upon Performance P and then upon Cost C (to the buyer), with indifference to or, more accurately, complete ignorance about and/or utter disregard for sustainability of commerce in the article. In free markets, sellers, including manufacturers, of products respond to what the buyers want: free market forces.

To help define sustainability attributes S, a practical quantitative method is provided for determining sustainability of articles of manufacture. Sustainably Recyclable ratio, SR, is defined as follows:

$$SR = \text{Avg. Footprint of Candidate Design/Avg. Footprint of Reference Design} \quad (1)$$

The lower this ratio, the lower the "footprint" of the candidate design relative to a reference design, and therefore the more sustainable the candidate design can be. In the rPET vs. PET example above $$SR = 0.52 \quad (2)$$

It can be concluded from the LCAs above or the SR in Equations 1 and 2 that articles of manufacture made from rPET have about half the "footprint" as articles made from virgin PET, assuming that the manufacturing processes are more or less the same. The simple ratio criterion of Equation 1 thus defines "sustainably recyclable" which definition can be extended to read $$\text{Sustainably Recyclable Criterion: IF } SR < SR_{max} \quad (3)$$

The Sustainably Recyclable ratio SR can be extended to be a ratio of a candidate design using one material of construction to a reference design using another material. Alternatively, the candidate and reference designs can use the same materials of construction but different manufacturing processes. Evidently, SR can be a useful design expedient. Its applicability to the design process is now further explained. The design process logic flow chart 30 in FIG. 3 can further elucidate the sustainability aspects of the present subject matter. One (hereinafter also meaning a team of designers), can start at step 150 the logical design process by examining broad market needs and, also broadly, can input at step 140 information about technologically feasible materials of construction and manufacturing processes. Importantly, and also broadly, one considers, as appropriate, competitive articles as one of many input components at step 140 to the decision-making process. These considerations would increasingly include inputs about the recycled materials 164. This starting step 150 can be called an exploratory market study.

If a favorable decision is determined in starting or exploratory marketing step 150 to proceed, then more detail, specific market needs and timing, technological capabilities, and competitive position can be examined at step 152. With emphasis, the determination of market needs and candidate design step 152 can be much more comprehensive than the exploratory step 150. One does not stop with determination of a need in the marketplace and a candidate design of an article to meet that need; step 152 can require, vis-à-vis marketable performance attributes P and cost attributes C attributes, a thoroughly-considered candidate design for the article, notably including candidate materials of construction and candidate manufacturing processes, and, most especially, projected performance attributes P and projected costs attributes C for the candidate design. This step 152 can be called a market and engineering feasibility study. It needs to be thorough.

Given the candidate design resulting from this step 152, one can proceed to execute a thorough market assessment 154. This assessment can be traditional in that it can fundamentally determine if the projected performance P and cost C attributes of the candidate design are commercially viable for the first use (and/or also reuses) of the article of manufacture being considered. Traditionally, this can lead to a business plan. If feasibility is determined for the candidate design, one can proceed to execution of the business plan. If not, the design process is iterated or the design is abandoned at step 155. If iterated, the design can proceed through steps 152 and 154 repetitively until the candidate design for the article can be released to manufacturing or is abandoned.

The next steps 156,158 can provide method details of quantitative determinations of sustainability. The later steps 160-165 following the innovative attention to sustainability 156, 158 can progressively, over time, differ in detail because of responses to the steps 156, 158 now disclosed.

Given passage of the market assessment 154, the candidate design is next subjected to a Life Cycle Assessment ("LCA") step LCA 156. LCA step 156 should be as thorough as the Market Assessment step 154. Step 156 can determine whether a candidate design will be accepted or rejected based on the LCA. The utility and expedience of using a Sustainably Recyclable ratio, SR, which is based on one or more LCAs, can assure that the candidate design is sustainably recyclable. If the candidate design meets ("Yes") the SR criterion, it can be released to the next step 158. If the candidate design does not meet ("No") the SR criterion, it is redesigned or abandoned 157. If confirmation is not required, the candidate design can be released directly to manufacturing 160 and other traditional steps. Importantly, the LCA step 156 puts the Sustainability attribute S into the same assessment and decision-making categories as the Performance P and Cost C attributes.

Figure 4:
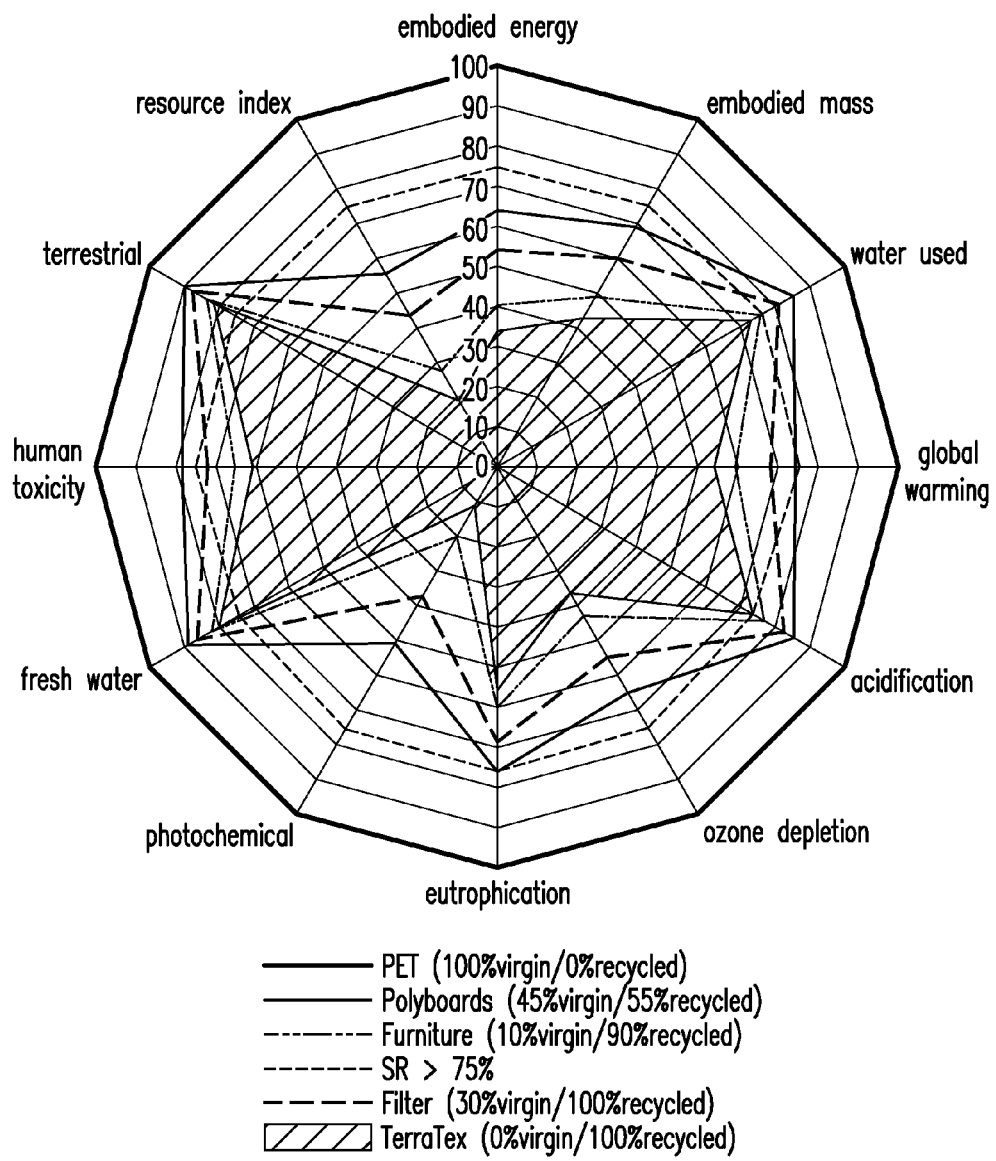
FIG. 4 illustrates a spider diagram of the elements of a sustainably recyclable ratio for embodiments of embodiments of sustainably recyclable articles of manufacture according to the present subject matter.

Recall the rPET vs. virgin PET LCA and SR considerations above, for composite panel assembly 10 shown in FIG. 1. Refer now to the process design flow chart 30 in FIG. 3 and contemplate composite panel assembly 10 proceeding through the design process 30 and, in particular, its assessments in steps 152, 154, 156 and 158. In practical reality, composite panel assembly 10, like any other article, should be commercially viable. If not, the design is iterated or abandoned. We executed several design iterations for prototype and limited production composite panels made of virgin PET, recycled PET and mixes thereof. FIG. 4 is a spider diagram for the 12 LCA factors discussed above. Candidate designs have been plotted in the spider diagram of FIG. 4 for a structural body section 101, film barrier 102, and/or fabric 103 also known as and aptly named on the diagram as Polyboard for printing applications, filter for fluid filter applications, and the fabric, TerraTex®. 100% virgin PET is the reference material for the woven polyester fabric with each LCA factor radius is set to 1.00 for 100% virgin PET. 100% recycled PET or rPET is the candidate material for the same fabric construction and manufacturing processes with each radius in the spider diagram is the appropriate ratio. The smaller "footprint" area for rPET is a graphic representation of the improved sustainability of rPET, relative to virgin PET. Also shown in FIG. 4 are the LCA ratios for various blends of rPET and PET, referenced to virgin PET.

In the market assessment step 154, Performance P and Cost C attributes for various blends of rPET can thus be judged to be competitive. LCA steps 156 showing favorable Sustainably Recyclable ratio SR for the wide range of available rPET materials and manufacturing processes can be performed, before construction of prototypes is undertaken. It is understood that market assessment step 154 and LCA step 156 can be performed in any order. An example of a useful pass/fail criterion for sustainably recyclable products made from blends of rPET and PET can be and can lie in the range:

$$SR_{max} \sim about\ 0.50\text{-}about\ 0.90 \qquad (4)$$

For instance, the SRmax can be between about 0.6 and about 0.8. Generally, prototype(s) for candidate design articles of manufacture in steps 152,154,156 can typically constructed for evaluation. In some cases, enough market and design information can be known to project performance P, cost C and sustainability S attributes reasonably accurately, thus making construction of prototype(s) unnecessary.

However, with or without prototypes, production articles can be evaluated in step 158 to confirm that the performance P, cost C, and sustainability S attributes of the candidate design can be realized. These confirmations particularly confirm sustainably recyclable performance.

When a candidate design progresses to manufacturing step 160 in design process logic flow 30 of FIG. 3, it is deemed ready for sales, distributions and uses in sustainable commerce. These activities are known and do not require further explanation. It is noteworthy that the article can be used once or, preferably, reused several times. Reuse can be an important consideration in LCA and the Sustainably Recyclable ratio criterion, SR<SRmax.

A few clarifying remarks conclude this disclosure of a first embodiment. At the end of the article's useful life it can be disposed of at step 162. For example, the article can be disposed of either for subsequent uses of its materials according to the recycling path 161, to burn or compost applications at step 163 or to a land fill at step 165. Landfills are to be avoided except as absolute last resorts, vis-à-vis sustainable commerce. In some embodiments, commercial practices can evolve to combining LCA and SR step 156 into the market assessment step 154. If/when that occurs, then sustainability S attributes for articles of manufacture will move toward equality with performance P and cost C attributes. It perhaps needs to be emphasized that, in market assessment step 154 and LCA assessment step 156, thorough attention to disposal step 162 can be desirable. Among the goals and objectives of competent and conscientious commercial practices is elimination of articles into landfills. More and more articles can move into the recycling path with effective use of the present subject matter.

b. Fluid Filter

The widely-known purposes of a fluid filter 2 as shown in FIGS. 5-9 can include removal of particulate, liquid or gaseous materials transported by fluid flows. For example, for particulates/aerosols, common furnace filters are used in air conditioning residential and commercial buildings. For liquids, water removal or "drying" media can be used in compressed air lines. For gases, carbon or charcoal treated media can be used for removal of toxic gases such as benzene or formaldehyde in respiratory masks for worker protection. Disclosed in this section are 5 configurations of a filter 2 embodiment, made in accordance with the present subject matter and also, generally, in accordance with the materials of construction and manufacturing processes disclosed for composite panel assembly 10 described above. Recycled PET and virgin PET are again used for illustration purposes but not limitation.

Figure 5:
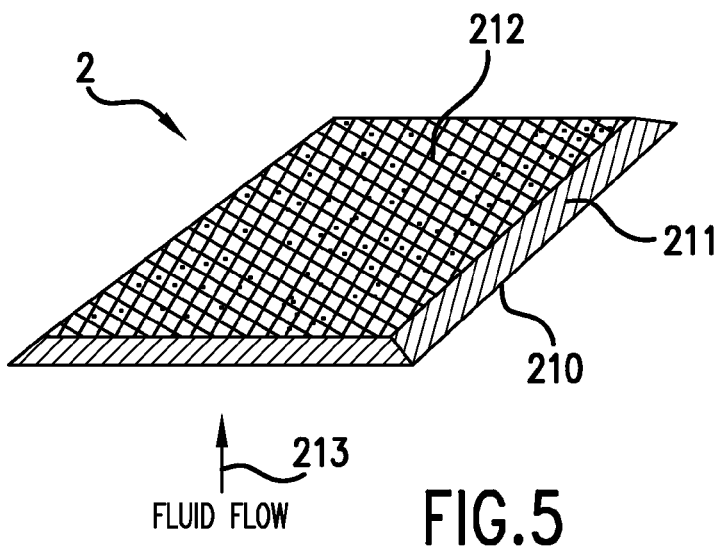
FIG. 5 illustrates a schematic perspective view of an embodiment of a sustainably recyclable filter according to the present subject matter.
Figure 6:
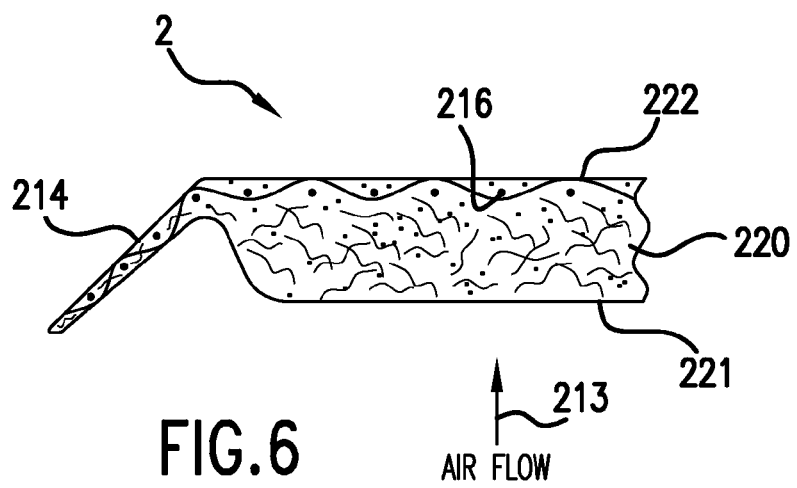
FIG. 6 illustrates a schematic cross-sectional view of an embodiment of another sustainably recyclable filter according to present subject matter.
Figure 7:
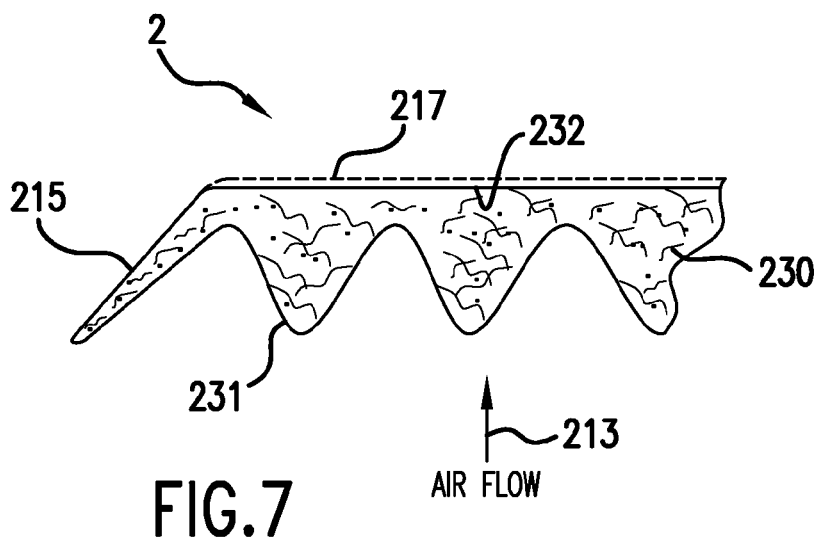
FIG. 7 illustrates a schematic cross-sectional view of an embodiment of an additional sustainably recyclable filter according to the present subject matter.
Figure 8:
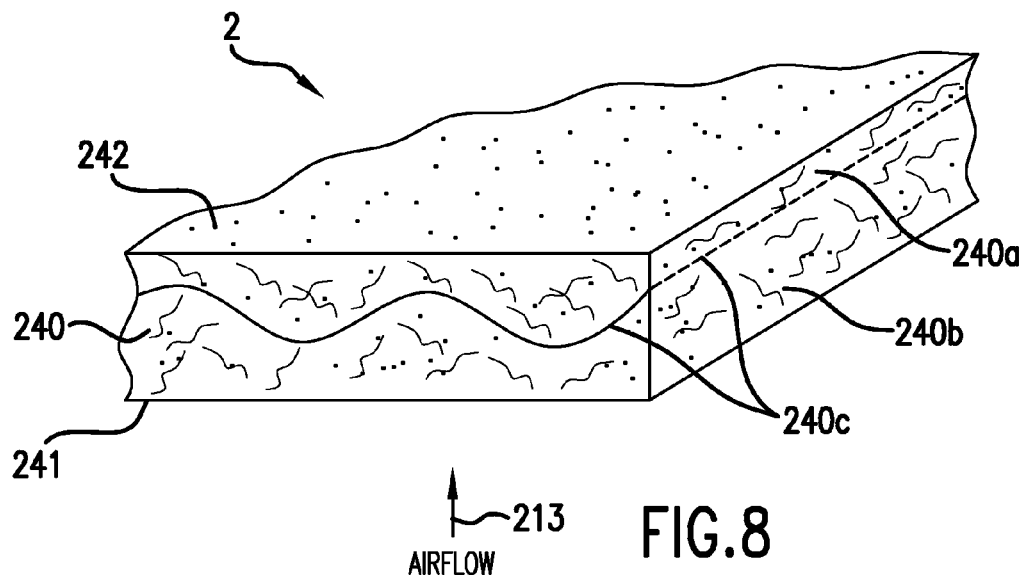
FIG. 8 illustrates a schematic perspective view of an embodiment of a another sustainably recyclable filter according to the present subject matter.

A first configuration of fluid filter 2 is seen in FIG. 5 to comprise these basic elements: filtration media 210, frame 211 and restraining screen or mesh 212. The sides of filter 2 are seen to slope; this is because sloping sides can be formed and provide structural rigidity. In FIG. 5, the inlet and outlet surfaces or faces of media 210 can be surfaces that are generally about planar. Media 210 can typically be made of fibrous materials with homogeneous density and uniform fluid flow permeability across the inlet and outlet faces. Inlet or entrance surfaces and outlet, discharge or exit surfaces can be seen more clearly in cross sectional end views in FIG. 6, 7 or 9. Fluid flow arrow 213 symbolizes movement of fluid into an inlet face and discharge from an outlet face which is generally about coplanar with mesh 212. Mesh or screen 212 and frame 211 can support and restrain filter media 210 against pressure drop and weight forces. FIGS. 6-8 show other fluid filter 2 configurations in which fluid flow arrow 213 again symbolizes movement of fluid into an inlet face 221, 231, 241, then through filter media 220, 230, 240 and finally discharge from an outlet face, 222, 232, 242.

In FIG. 6, fluid filter 2 can have homogeneous media 220 with planar inlet face 221 and planar outlet face 222. Frame 214, as well as restraining mesh 216, can be made integrally with media 220 as seen in FIG. 6. This can be accomplished by heat and pressure treatments upon the composite media 220, as discussed below. FIG. 7 shows homogenous media 230 having a pleated or V-shaped inlet surface 231 and a planar outlet surface 232. Frame 215 and restraining mesh 217 serve the same functions as the embodiment shown in FIG. 6. Restraining mesh 217 can be omitted for some low pressure drop applications in the configuration of filter 2 of FIG. 7 due to the inherent stiffening of the V-shape inlet surface 231.

FIG. 8 shows a filter assembly 2 that can have a non-homogeneous media 240 without either frame or stiffening screens, for clarity. Inlet 241 and outlet 242 faces and flow arrow 213 can have the same meanings as in the corresponding elements of FIGS. 5-7. In the non-homogeneous configuration, the media 240a near inlet face 241 can have lower density and/or higher dust-holding capacity per unit volume than the media 240b near the outlet face 242, which can have higher filtration efficiency. This feature can permit larger particles, such as fibrous particles, to be captured first and smaller particles to be captured second, thus diminishing the effects of blinding and improving both the service life and dust removal capabilities of filter assembly 2. The non-homogeneity in FIG. 8 is shown to have a "step" character, meaning that the media density of inlet section 240a can be substantially the same transverse to or across the filter and can change quickly or can "step" to a higher density that can also be substantially the same across outlet section 240b. The step change can occur in the near vicinity of boundary 240c. More gradual gradients parallel to the fluid movement direction 213 and variable densities transverse to the fluid movement direction 213 can be useful in alternative designs.

Figure 9:
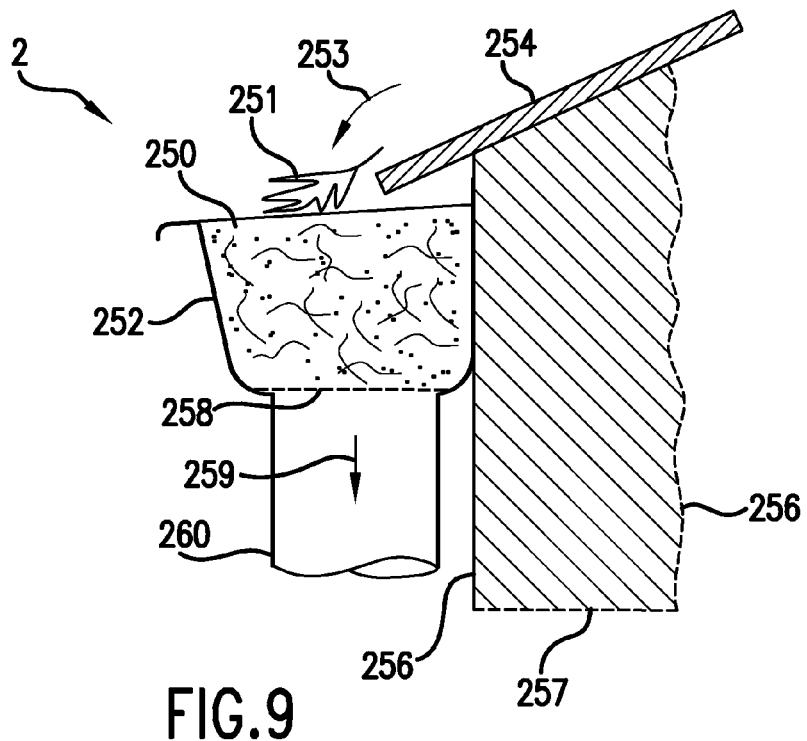
FIG. 9 illustrates a schematic cross-sectional view of an embodiment of a further sustainably recyclable filter according to the present subject matter.

FIG. 9 reveals, in a cross-sectional view, another configuration shape and function for fluid filter 2. Filter media 250 can be inserted into gutter 252 to filter leaves and other debris 251 out of rainwater flows 253 from roof 254 and into filter media 250. Leaves and other debris 251 removed or filtered from inlet flow 253 can simply blow away upon drying and do not block water flow along the bottom of gutter 252 and out of gutter 252. Filtered outlet flow 259 can move downward through discharge pipe 260, also known as a downspout. Representative portions of roof 254 and exterior wall 255 are illustrated left and upward of dashed section lines 256, 257. Gutter 252 and downspout 260 are known elements of a residential or commercial structure. Restraining screen 258 can be in most applications optional since filter media manufactured according to the present subject matter can typically be sufficiently rigid. Reusable and recyclable filter elements 250 can be easily and cost-effectively installed into gutter 252. They are also easily removed for infrequent cleaning.

In accordance with the present subject matter, sustainably recyclable fluid filters 2 having media elements 250 can be advantageously made. It is also widely known that the performance and life cycle costs for fluid filters 2 can be highly dependent upon the media materials of construction.

It can be appreciated that the media elements 210, 220, 230, 240, 250 of filter 2 in FIGS. 5-9 are generally similar to body section 101 of composite panel assembly 10 in FIG. 1. Whereas one principle design requirement for structural body section 101 can be to produce a semi-rigid panel and one principle design requirement for media 210, 220, 230, 240, 250 can be to produce filter elements permeable to fluid flows 213, 253, which design requirements evidently yield different functionalities, the materials of construction and manufacturing processes for both can be advantageously and remarkably similar. As described above, both filter media elements and composite panel elements can be made from polymeric, fibrous, non-woven (and other) constructions and thus have the advantages of using sustainably recyclable materials. It therefore follows that the aspects of the present subject matter directed to recyclability as a whole and to design processes that utilize Sustainably Recyclable ratios SR based on Life Cycle Assessments can apply to both. Thus, it is sufficient to rely upon the disclosures of Sustainably Recyclable ratios SR based on Life Cycle Assessments for the composite panel embodiment for both the fluid filter embodiment above and the recyclable furniture systems below.

c. Recyclable Furniture Systems

Each of the two above-described embodiments for composite panel assembly 10 of FIG. 1, or filter 2 of FIGS. 5-9, disclose two aspects of the present subject matter, namely, recyclability of the article of manufacture as a whole and design processes employing Life Cycle Assessments LCAs and Sustainably Recyclable ratios SR derived therefrom. The recyclable furniture systems embodiment now described also employs these aspects and discloses additional features of the present subject matter, including modular and multi-functional elements.

There is a growing niche market for furniture which can be assembled by consumers. Such niche consumers expect and appreciate furniture that is: esthetically pleasing (i.e., it is compatible with the consumer's expectations of decor); versatile (i.e., it can be assembled by the consumer and each of the modular elements can serve multiple purposes); durable (i.e., it can withstand the wear of everyday use without much attention); and low-cost (i.e., competitive in purchase, maintenance and, increasingly, in disposal costs). Modular, multi-function, ready-to-assemble components can enable versatility, durability, and lower purchase costs for the consumer. A first article can be purchased and, later, some/all of the components, with or without additional component parts, can be reassembled into another article and reused. One example is conversion of a futon bed into a couch and/or a table. The furniture articles can be shipped unassembled and with condensed packaging to permit reliable shipment and storage. This feature can lower manufacturing, shipping and warehousing costs, thus lowering the supply chain environmental impact. It can also add a level of consumer convenience when the article is disassembled for moving, storage or disposal (see below). In such embodiments, no special tools or instructions may be needed for assembly or disassembly by the consumer. High wear parts can be removed for cleaning or replacement. Some parts can be changed simply to change the shape or function or decor. Finally, all components, including fasteners, are of similar chemical composition for recycling as a whole, thereby minimizing separation costs.

An example that can elucidate the issues about separation costs can be the use of hotel conference room chairs of current design and commercial practice. Such chairs are reupholstered approximately every two years. If these chairs are sustainably designed so that the cushion, fabric, and internal support (webbing or board) were made from similar materials and easily removed, the process flow can significant improvement compared to current practice, thus improving LCA. Table 1 summarizes the major points of the findings.

TABLE 1

Comparison of Separation Costs for hotel conference room chairs

|  | Current Design | Sustainable Design |
| --- | --- | --- |
| Transportation Costs | 4x | 2x |
| Labor Cost | 3x | x |
| Labor | skilled | unskilled |
| Landfill | yes | no |

The lower disposal costs feature of sustainably recyclable articles of manufacture is growing in importance as designers, manufacturers, merchants and, of course, consumers become more aware of and sensitive to sustainability. By making all of the components, including fasteners, of chemically similar but physically different polymeric materials, virgin, recycled or mixes thereof, parts or the entire furniture article as a whole can be recycled. No or minimal separation efforts or costs can thereby be achieved.

Before disclosing a detailed description for this recycled furniture embodiment, it is further helpful to compare disposal of a mattress, using current practices, versus future practices, in accordance with the present subject matter.

Example 2

Conventional vs. Recyclable Mattress: Recycling Process Flow Comparison

A. For conventional mattresses, mattress elements of construction are fabric, polyurethane, adhesives, wood, and metal. If a consumer wishes to recycle the article at the end of its life, these are the steps:
 1. The consumer has to find a local mattress recycler.
 2. The consumer will need to safely transport the mattress to a local recycler.
 3. The consumer will need to pay a $10-$20 fee for recycling the mattress.
 4. The recycler will grade and sort the mattresses into piles for disassembly.
 5. The recycler will separate elements of construction into piles which takes approximately 10 minutes.
 6. The recycler collects, packages, and ships materials of construction to metal recycler, fabric and polyurethane recyclers, wood recyclers, and landfill.
 7. The buyer will convert the low-cost material into a useful product.

Evidently, recycling is non-viable economically, so old mattresses go to a landfill and no enhancements of sustainability are realized by such "recycling." This current situation most unfortunately applies to most articles of manufacture used by consumers.

B. In accordance with the present subject matter, the entire mattress can comprise chemically similar material elements (i.e., recycled polyester, rPET) and the process steps for recycling it as a whole at the end of its initial life will be:
 1. The consumer will need to transport the mattress to the curb next to the recycling bin.
 2. The recycler will transport the mattress from the curb to the recycling center.
 3. The recycler will grind the mattress for efficient transportation to the buyer (along with other PET products).
 4. The buyer will convert the low-cost material into rPET chip for re-extrusion.

This recycling process can be considered viable and greatly enhances sustainability. Placing a manufactured article in the recycling bin without material separation can make it easy on the consumer end-user, increasing the probability that the material will be reused again. It can also reduce the handling, transportation, and processing cost incurred by the recycler and can provide a low cost raw stock material input for the manufacturer. Furthermore, if the recycled materials cannot be used again, the embodied energy can be captured such that the net impact on the environment to produce these products is reduced in the initial as well as subsequent iterations and processes.

It may be appreciated that some of the furniture elements 5 in FIGS. 10a-19c are generally similar in materials of construction and manufacturing processes to some of the elements of composite panel assembly 10 in FIG. 1 and/or of filter 2 in FIGS. 5-9. Recycled PET and virgin PET are again used for illustration only and not as a limitation. Subsequent to the following disclosure, it can be further appreciated that the additional disclosed features for recyclable furniture can also be applied to the panel and filter embodiments, as well as vice versa.

In FIGS. 10a-10c, furniture framing elements 5 can comprise chemically similar but physically different polymeric materials with representative shapes seen and dimensions as follows. Rods or dowels 301 in FIG. 10a can be solid cylinders with typically circular, elliptical or rectangular cross sections and outer dimensions of typically about 3/16" to about 1.0" and lengths from about 1" to about 3". Tubular forms 302 are seen in FIG. 10b and can also have circular, elliptical or rectangular cross sections and lengths from typically about 3" to about 48". FIG. 10c reveals a rectangular plate element 306 with mounting holes 303 formed, drilled or punched in plate element 306 by known material-working means. Plate 306 can have a typical thickness in the range of about 0.25" to about 1" and transverse dimensions x, y in the range of about 3" to about 20". FIG. 11 reveals how the internal and external dimensions, as well as lengths of rods 301 and tubes 302 can be designed for efficient shipping and storage. Furniture framing elements 5 are constructed of chemically similar polymeric materials which can, of course, be formed to any shape or size required and which can be recycled, along with other chemically similar but physically different elements 5 comprising the article of manufacture.

Figure 12A:
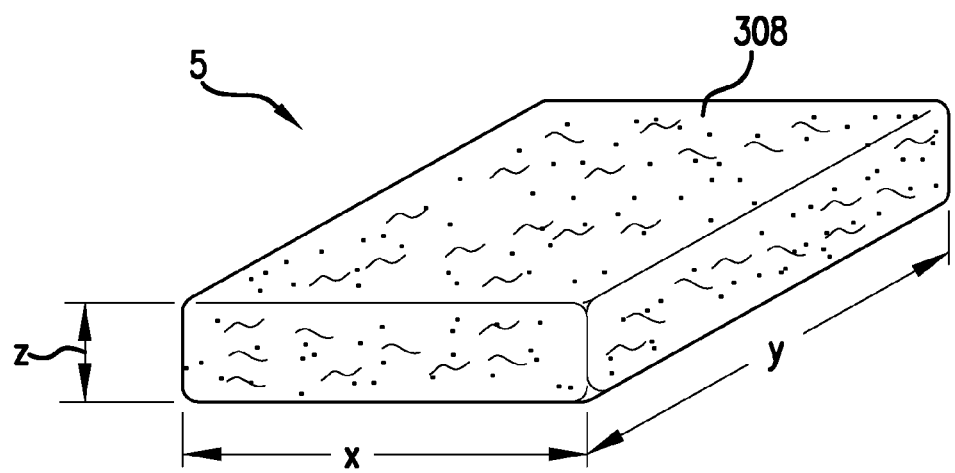
FIGS. 12a-12b illustrate schematic perspective views of embodiments of additional sustainably recyclable furniture elements according to the present subject matter.
Figure 12B:
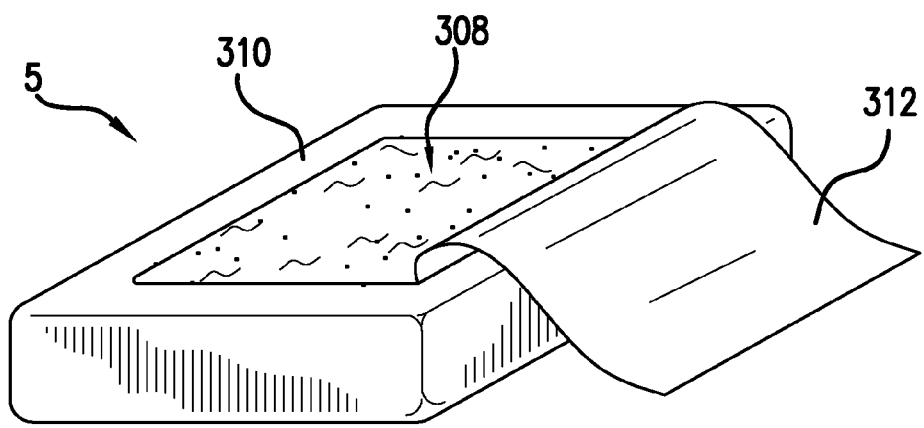

FIG. 12a illustrates another furniture element 5 in the form of a cushion 308 with more or less parallelepiped shape and typical dimensions of height z from about 1" to about 8" and width x and depth y from about 8" to about 30". Cushion 308, like the chemically similar polymeric structural or "hard" elements 5 in FIG. 10, may be formed into any required shape or size. Cushion 308 is preferably constructed of polyester fibers ranging from about 65+/− about 15% rPET and about 35+/− about 15% low melt using 3-500 denier fibers. Typical equipment to form these cushion can range from carded, cross-lapped thermobond lines, airlaid thermobond lines, knitting machines for knitting spacer fabrics or the like. FIG. 12b illustrates the same type of cushion 308 with cover 310, shown with a flap 312 pulled back to reveal internal cushion element 308. Cover 310, including flap 312, can be of knit construction so that said cover can be pulled over cushion 308 and flap 312 tucked in so that no zippers or sewings or adhesives are required. Flap 312 can alternatively comprise a completely removable top panel as a replaceable, high wear component by zipper, sewing or other known attachment means, so long as the attachment means are chemically similar. Cushion 308 can be made using known means such as described above. Cushion cover 310 can be a woven, knitted or non-woven fabric made using known textile woven, knitting, and nonwoven processes. For woven covers 310, Terra-Tex®, woven from rPET or virgin PET yarns, can be used.

Figure 13:
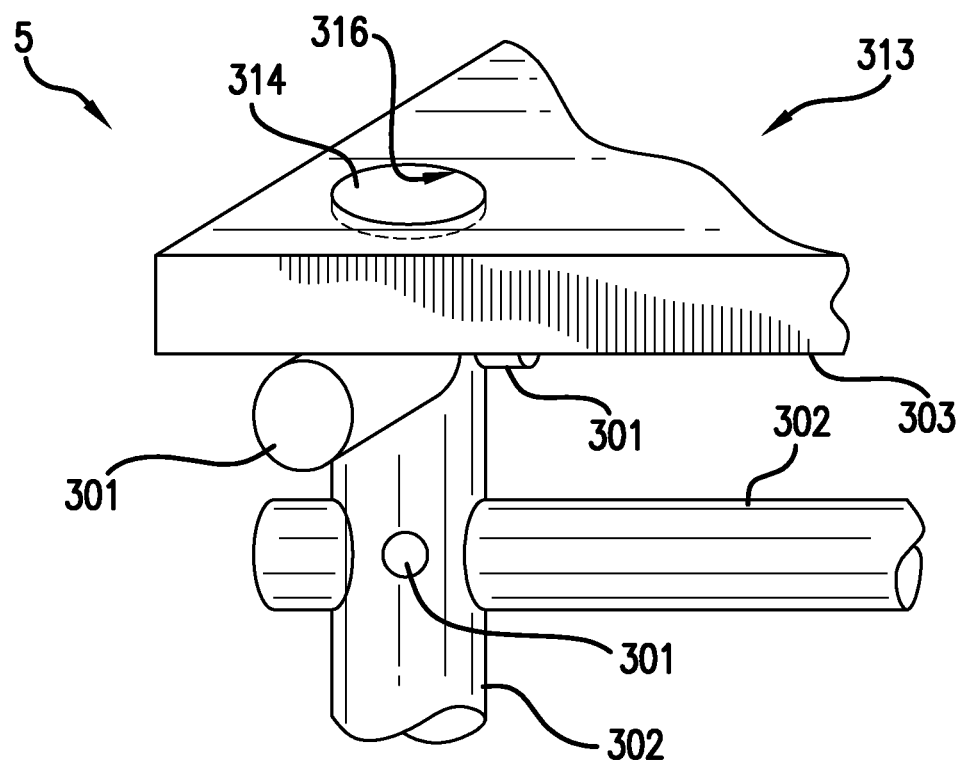
FIG. 13 illustrates a schematic perspective view of another embodiment of a sustainably recyclable furniture element according to the present subject matter.
Figure 14:
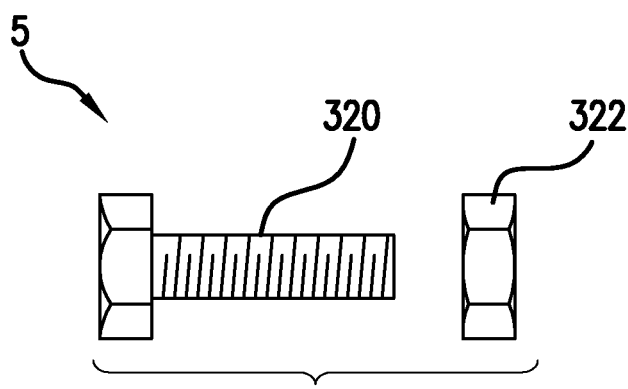
FIG. 14 illustrates a schematic perspective view of another embodiment of a sustainably recyclable furniture element according to the present subject matter.
Figure 15A:
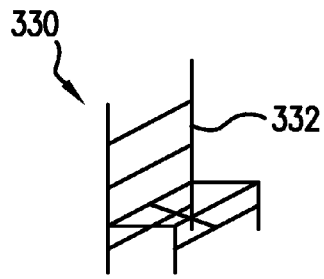
FIGS. 15a-15f illustrate schematic perspective views of embodiments of sustainably recyclable furniture and furniture elements according to present subject matter.
Figure 15B:
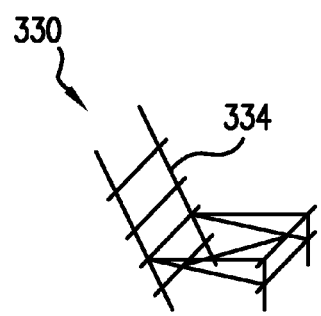
Figure 15C:
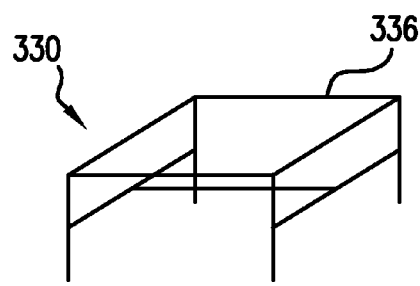
Figure 15D:
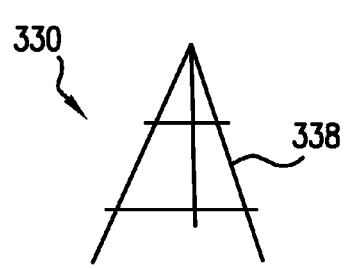
Figure 15E:
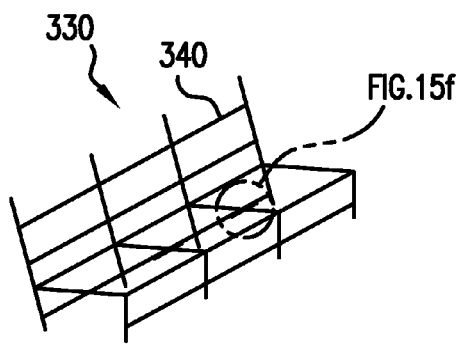
Figure 15F:
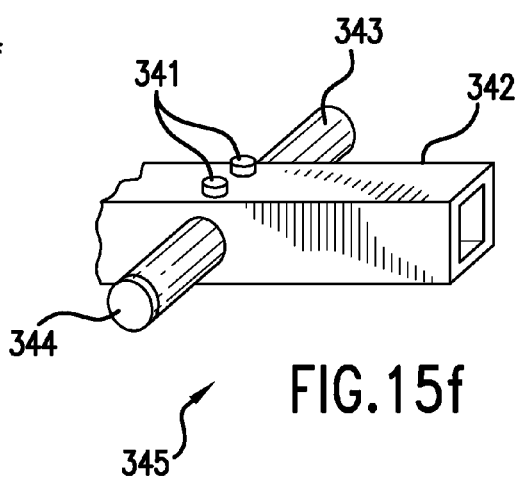

FIG. 13 is a partial perspective view showing an assemblage of furniture elements 5 comprising a corner of table 313. The assemblage can comprise aforementioned elements 5 in FIG. 10, namely, comprising frame elements such plate 303 for the top, tubes 302 for the legs and cross braces, and rods or dowels 301 to secure elements 5 together. A cover plate 314 is a circular disc or plug that can be set into a hole 316 at the top of leg 302. Alternatively, table top 303 can be counterbored or formed so that that tubular leg 302 can be snugly fit into it, thereby fully occupying hole 316 in top 303 of table 313.

Assembly of furniture elements 5 into a useful article such as table 313 can require only hand forces or, at most, commonly available, elementary tools. Any special fasteners that may be desired or needed, such as bolts 320, nuts 322, washers, etc, FIG. 14, can be provided in the shipping box, along with instructions for assembly and disassembly. Such fasteners can be made of the same chemically similar materials as the rest of furniture elements 5. Any special tools that may be needed, such as wrenches, alignment bars, or various drivers, etc., can also be supplied in the package of elements and, to the maximum degree possible, can be constructed of similar materials, as is the packaging material to facilitate recyclability.

FIGS. 15a-15F show frameworks for various articles of furniture 330 that can be assembled from furniture elements 5 and can include: upright chair 332, leaning chair 334, table 336, easel 338, and sofa 340. Not shown, for clarity, are cushions, covers and the like. Chairs 332, 334 can be the same chair whose configuration is simply adjusted by means of linkage 345 seen in FIG. 15f and comprised of rectangular tube 342, round tube 343, dowel pins 341 and end plug 344. Linkage 345 can be adapted to sofas and other articles for which the adjustment or locking functionalities are desirable.

Figure 16A:
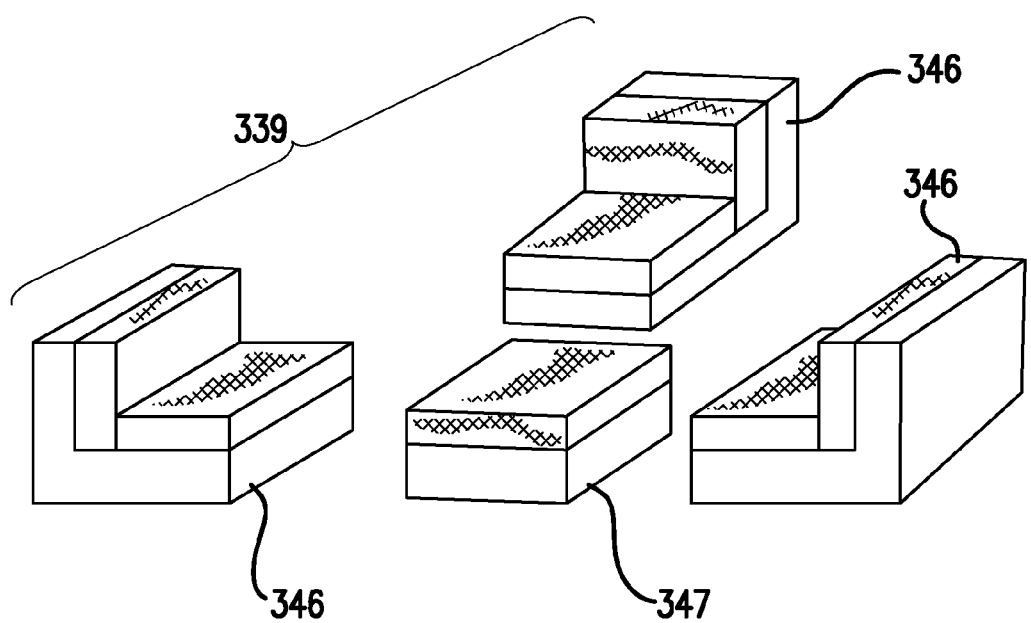
FIGS. 16a-16c illustrate schematic perspective views of embodiments of sustainably recyclable furniture and furniture elements according to the present subject matter.
Figure 16B:
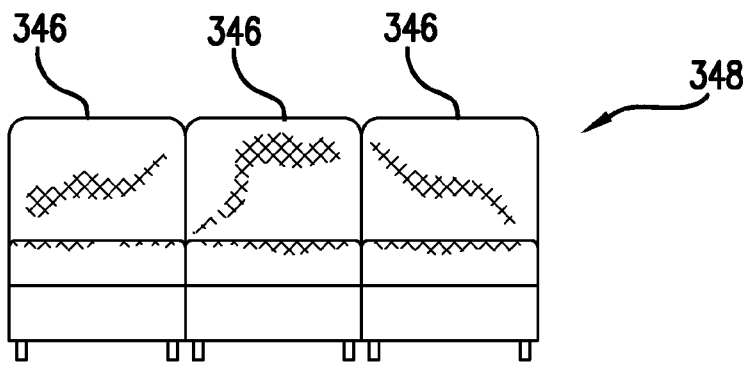
Figure 16C:
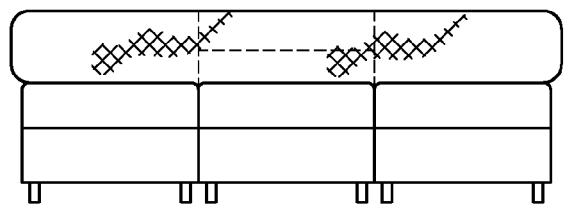

FIGS. 16a-16c show how arrangements of selected articles of completed furniture 330, with cushions 310, can be grouped or connected together to adapt to the particular needs of the user. FIG. 16a shows a seating area 339 that can comprise cushioned chairs 346 and an ottoman 347. FIG. 16c shows how cushioned chairs 346 can be connected together to form a couch 348. FIG. 16c shows how a couch can be connected to form a bed 349.

Figure 17:
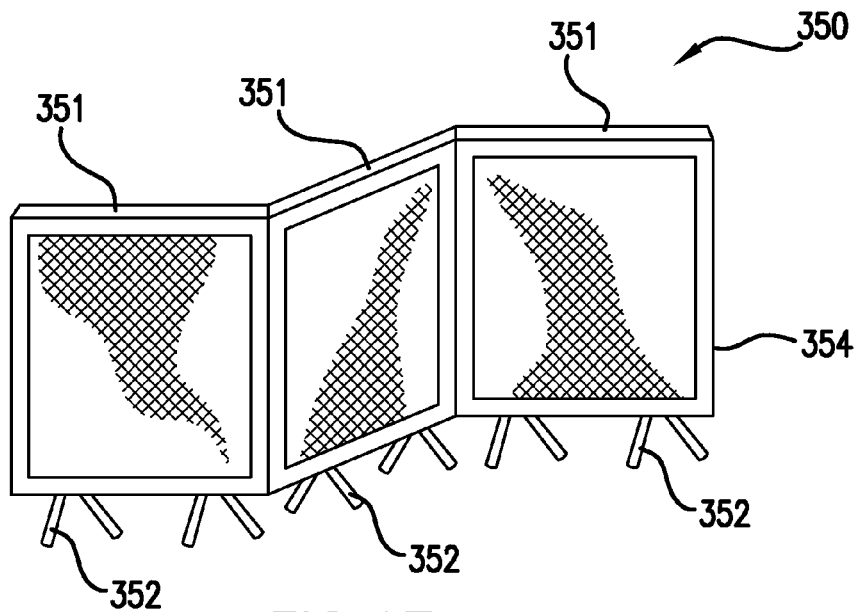
FIG. 17 illustrates a schematic perspective view of another embodiment of a sustainably recyclable furniture element according to the present subject matter.

FIG. 17 shows how multiple panels 351 can be connected and provided with rigid legs 352 to form a screen system 350. Panels 351 can be constructed in accordance with composite panel assembly 10 or the polyboard created by combining of structural body section 101, film barrier 102, and/or fabric 103 as described above and seen in FIG. 1. Legs 352 can be constructed of tubular elements 302 as shown in FIG. 10b, and can be attached to frame 354 by known means.

Figure 18:
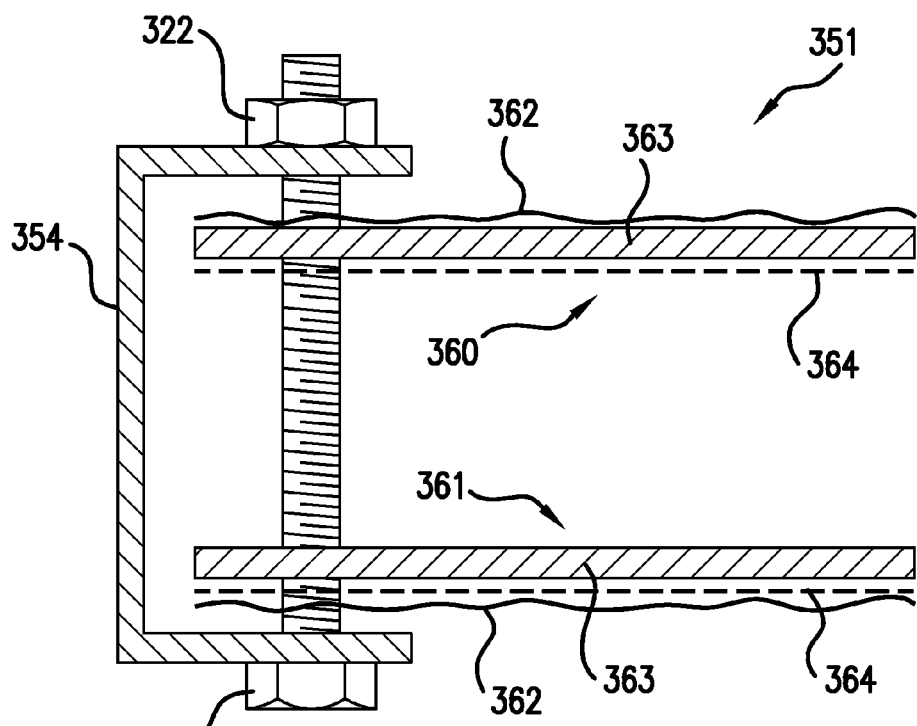
FIG. 18 illustrates a schematic cross-sectional view of a portion of an embodiment of a sustainably recyclable printable composite panel according to the present subject matter.

FIG. 18 is a partial cross-section revealing details of construction for panel 351. Each of two separate panels 360, 361 can be constructed general like the polyboard created by combining of structural body section 101, film barrier 102, and/or fabric 103 shown in FIG. 1, and can comprise decorative fabric cover 362, non-woven, semi-rigid body 363, and film barrier 364. Note that film barrier 364 can be located differently for panel 360 than for panel 361 for sound isolation purposes. Frame 354 can support the two panels 360, 361, which panels can be separated (not shown) (also for acoustical isolation) by known means. Each of separate panels 351 can be a stand-alone unit but they can be secured together, also by known attachment means.

Figure 19A:
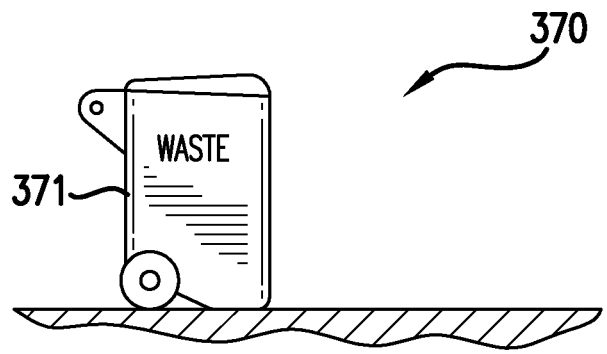
FIGS. 19a-19c illustrate schematic views of disposal methods.
Figure 19B:
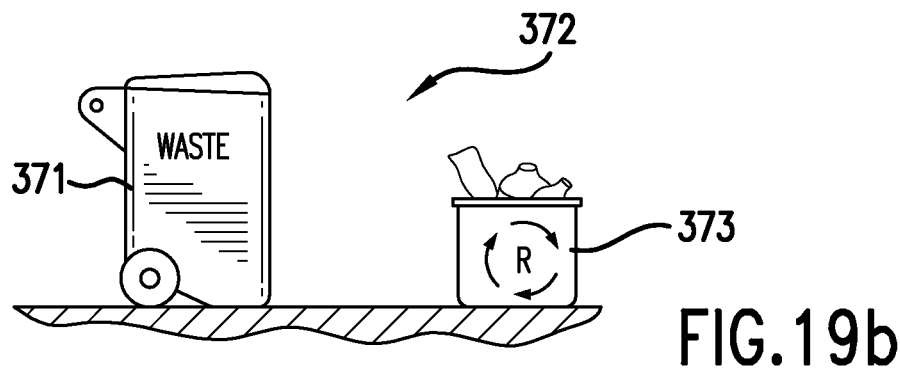
Figure 19C:
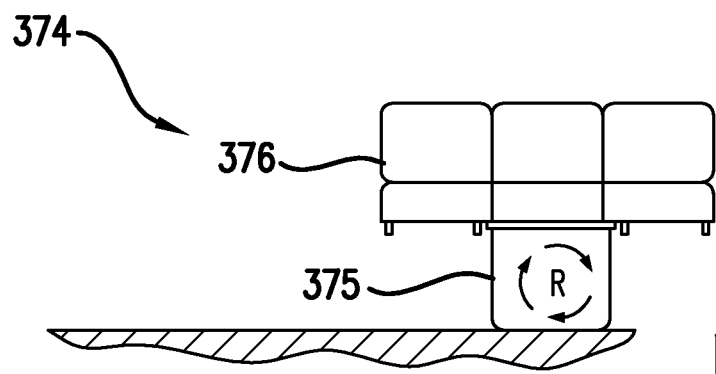

FIGS. 19a-19c are pictorial representations of how disposal of articles of manufacture can generally be handled. In the past as depicted in FIG. 19a, practices 370 of disposal of waste generally comprised placing the waste in a waste container 371 to transport them to a land fill. Currently, as depicted in FIG. 19b, practices 372 of disposal of waste generally can comprise placing portions of the waste in a waste container 371 and increasing use of a recycling container 373 for glass, paper, metals, etc, but not for polymeric articles of manufacture, such as furniture. According to the present subject matter, future practices 374, particularly those relating to polymeric articles of manufacture like furniture 376, can comprise also placing such polymeric articles of manufacture in recycle containers or pickup zones 375, as enabled by sustainably recyclable designs.

Like both composite panel assembly 10 elements and filter media 2 elements, the furniture elements 5 and the entire article of manufacture may be designed, made, used and recycled in accordance with the present subject matter. It follows that all aspects of the present subject matter, recyclability as a whole, design processes that utilize Sustainably Recyclable ratios SR based on Life Cycle Assessments, and modular and multi-functional components apply to all three embodiments.

Embodiments of the present disclosure shown in the drawings and described above are exemplary of numerous embodiments that can be made within the scope of the appending claims. It is contemplated that the articles of manufacture and related methods can comprise numerous configurations other than those specifically disclosed. The scope of a patent issuing from this disclosure will be defined by these appending claims.

What is claimed is:

1. An article of manufacture that is sustainably recyclable, the article comprising:
a first element comprising a first polymeric material comprising recycled first polymeric material or a combination of recycled first polymeric material and virgin first polymeric material with the first element having a first physical parameter;
a second element comprising a second polymeric material comprising recycled second polymeric material, a combination of recycled second polymeric material and virgin second polymeric material, or 100% virgin second polymeric material with the second element having a second physical parameter; and
the first polymeric material of the first element and the second polymeric material of the second element are substantially chemically similar and the first physical parameter of the first element and the second physical parameter of the second element are physically different and the article of manufacture comprising the first and second elements having an assigned overall impact footprint based on a life cycle assessment before manufacture of the article calculated by averaging multiple impact factors;
the article of manufacture comprising the first and second elements having a sustainably recyclable ratio of less than one based on the assigned overall impact footprint of the article of manufacture based on the life cycle assessment measured against an assigned overall impact footprint based on the life cycle assessment of a reference design for a same type of article of manufacture calculated by averaging the same multiple impact factors, the reference design of the same type article of manufacture comprising at least one of a first element comprising 100% virgin first polymeric material or a second element comprising 100% virgin second polymeric material.

2. The article of manufacture according to claim 1, wherein the first polymeric material of the first element and the second polymeric material of the second element are chemically similar in a manner that permits both the first element and the second element to be recycled together.

3. The article of manufacture according to claim 1, wherein the first polymeric material of the first element and the second polymeric material of the second element are chemically similar in a manner that permits the article of manufacture to be recycled as a whole.

4. The article of manufacture according to claim 1, wherein the first polymeric material of the first element and the second polymeric material of the second element are chemically the same.

5. The article of manufacture according to claim 1, wherein the first polymeric material of the first element and the second polymeric material of the second element comprise at least one of virgin polyethylene terephthalate ("PET") or recycled polyethylene terephthalate ("rPET").

6. The article of manufacture according to claim 1, wherein the first physical parameter of the first element has a different density than the second physical parameter of the second element.

7. The article of manufacture according to claim 1, wherein the assigned overall impact footprint of the article of manufacture comprising the first and second elements is divided by the assigned overall impact footprint of the reference design of the same type of article of manufacture to determine the sustainably recyclable ratio of the article of manufacture comprising the first and second elements.

8. The article of manufacture according to claim 1, wherein the assigned overall impact footprint of the article of manufacture comprising the first and second elements and the assigned overall impact footprint of the reference design of the same type of article of manufacture are determined using the same multiple impact factors selected from the group consisting of an embodied energy, an embodied mass, a water usage potential, a global warming potential, an acidification potential, an ozone depletion potential, an eutrophication potential, a photochemical oxidant potential, a fresh water ecotoxicity potential, a human toxicity potential, a terrestrial ecotoxicity potential, and a resource index.

9. The article of manufacture according to claim 1, wherein the assigned overall impact footprint of the article of manufacture comprising the first and second elements and the assigned overall impact footprint of the reference design of the same type of article of manufacture are determined using equally weighed impact factors of the embodied energy, the embodied mass, the water usage potential, the global warming potential, the acidification potential, the ozone depletion potential, the eutrophication potential, the photochemical oxidant potential, the fresh water ecotoxicity potential, the human toxicity potential, the terrestrial ecotoxicity potential, and the resource index.

10. The article of manufacture according to claim 1, wherein the first and second elements of the article of manufacture each comprise an impact footprint that is useable to determine the overall impact footprint of the article of manufacture.

11. The article of manufacture according to claim 1, wherein the sustainably recyclable ratio of the article of manufacture comprising the first and second elements is between about 0.5 and about 0.9.

12. The article of manufacture according to claim 1, wherein the first physical parameter of the first element has a different construction than the second physical parameter of the second element.

13. The article of manufacture according to claim 12, wherein the first element comprises fibers and the second element comprises a solid non-fibrous structure.

14. The article of manufacture according to claim 1, wherein the article of manufacture comprises furniture.

15. The article of manufacture according to claim 14, wherein the first element comprises a frame and the second element comprises a cushion.

16. The article of manufacture according to claim 15, further comprising a third element comprising a fabric cover comprising a third polymeric material and a fourth element comprising fasteners comprising a fourth polymeric material with the first polymeric material of the frame, the second polymeric material of the cushion, the third polymeric material of the fabric cover and the fourth polymeric material of the fasteners being chemically similar in a manner that permits the frame, the cushion, the cover fabric, and the fasteners to be recycled together.

17. The article of manufacture according to claim 16, wherein the piece of furniture comprising the first, second, third, and fourth elements has an assigned overall impact footprint and the assigned overall impact footprint of the furniture is measured against an assigned overall impact footprint of a reference design of a same type of piece of furniture wherein the reference design piece of furniture comprises at least one of a first element comprising a 100% virgin first polymeric material, a second element comprising a 100% virgin second polymeric material, a third element comprising a 100% virgin third polymeric material, or a fourth element comprising a 100% virgin fourth polymeric material to determine the sustainably recyclable ratio of the piece of furniture comprising the first, second, third, and fourth elements.

18. The article of manufacture according to claim 1, wherein the article of manufacture comprises a filter.

19. The article of manufacture according to claim 18, wherein the first element comprises a frame and the second element comprises a filter media.

20. The article of manufacture according to claim 1, wherein the article of manufacture comprises a composite panel assembly.

21. The article of manufacture according to claim 20, wherein the first element comprises a structural body section and the second element comprises a film barrier.

22. The article of manufacture according to claim 21, further comprising a third element comprising a fabric cover comprising a third polymeric material and a fourth element comprising a frame comprising a fourth polymeric material with the first polymeric material of the structural body section, the second polymeric material of the film barrier, the third polymeric material of the fabric cover and the fourth polymeric material of the frame being chemically similar in a manner that permits the structural body section, the film barrier, the cover fabric, and the frame to be recycled together.

23. The article of manufacture according to claim 22, wherein the composite panel assembly comprising the first, second, third, and fourth elements has an assigned overall impact footprint and the assigned overall impact footprint of the composite panel assembly is measured against an assigned overall impact footprint of a reference design of a same type of composite panel assembly wherein the reference design composite panel comprises at least one of a first element comprising 100% virgin first polymeric material, a second element comprising 100% virgin second polymeric material, a third element comprising 100% virgin third polymeric material, or a fourth element comprising 100% virgin fourth polymeric material to determine the sustainably recyclable ratio of the composite panel assembly comprising the first, second, third, and fourth elements.

* * * * *